(12) United States Patent
Park et al.

(10) Patent No.: US 11,277,548 B2
(45) Date of Patent: Mar. 15, 2022

(54) CAMERA MODULE

(71) Applicant: Samsung Electro-Mechanics Co., Ltd., Suwon-si (KR)

(72) Inventors: Nam Ki Park, Suwon-si (KR); Young Hwan Kwon, Suwon-si (KR); Young Bok Yoon, Suwon-si (KR); Dong Yeon Shin, Suwon-si (KR); Kum Kyung Lee, Suwon-si (KR); Ta Kyoung Lee, Suwon-si (KR); Jung Seok Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/841,975

(22) Filed: Apr. 7, 2020

(65) Prior Publication Data

US 2020/0351421 A1 Nov. 5, 2020

(30) Foreign Application Priority Data

Apr. 30, 2019 (KR) .................. 10-2019-0050936
Jul. 15, 2019 (KR) .................. 10-2019-0085338

(51) Int. Cl.
*H04N 5/225* (2006.01)
*H04N 5/232* (2006.01)

(52) U.S. Cl.
CPC ......... *H04N 5/2253* (2013.01); *H04N 5/2252* (2013.01); *H04N 5/23258* (2013.01)

(58) Field of Classification Search
CPC ............ H04N 5/2253; H04N 5/23258; H04N 5/2252; H04N 5/2254; H04N 5/2257;
(Continued)

(56) References Cited

U.S. PATENT DOCUMENTS 7,660,053 B2 * 2/2010 Naitou ................... G03B 13/34
359/819
8,818,181 B1 8/2014 Hwang et al.
(Continued)

FOREIGN PATENT DOCUMENTS

CN 101498827 A 8/2009
CN 105650261 A 6/2016
(Continued)

OTHER PUBLICATIONS

Korean Office Action dated May 13, 2021 in the related Korean Patent Application No. 10-2019-0092229 (9 pages in English)(6 pages in Korean).
(Continued)

*Primary Examiner* — Pritham D Prabhakher
(74) *Attorney, Agent, or Firm* — NSIP Law

(57) ABSTRACT

A camera module includes a housing; a lens module provided in an internal space of the housing to be movable in an optical axis direction, and including at least one lens therein; a magnet disposed in the lens module; and position detection sensors to detect a position of the magnet. One or more of the position detection sensors are disposed to face a first polarity of the magnet and one or more of the position detection sensors are disposed to face a second polarity of the magnet different than the first polarity.

20 Claims, 33 Drawing Sheets

(58) Field of Classification Search
CPC ............ H04N 5/23241; H04N 5/2328; H04N 5/23287; G02B 27/646; G02B 27/64; G02B 27/0075; G02B 7/09; G02B 7/102; G02B 7/08; G02B 13/0065; G03B 2205/0015; G03B 2205/0069; G03B 2205/0007; G03B 17/17; G03B 17/04; G03B 17/12; G03B 3/10; G03B 5/06; G03B 5/00; H04M 1/0264; G01B 7/003
USPC ....................................................... 348/208.8
See application file for complete search history.

(56) References Cited

U.S. PATENT DOCUMENTS

| | | | |
|---|---|---|---|
| 8,995,241 B1* | 3/2015 | Heo .................. | G02B 7/08 369/44.14 |
| 9,134,503 B2* | 9/2015 | Topliss ............. | G02B 7/08 |
| 9,438,801 B2* | 9/2016 | Hwang .............. | G02B 7/08 |
| 9,915,802 B2* | 3/2018 | Murakami ......... | G03B 5/00 |
| 10,126,633 B2* | 11/2018 | Avivi ................ | G02B 27/64 |
| 10,334,146 B2* | 6/2019 | Im .................... | G02B 15/14 |
| 10,353,217 B2* | 7/2019 | Yeo .................. | G02B 7/08 |
| 10,372,022 B2* | 8/2019 | Avivi ................ | G03B 5/06 |
| 10,416,473 B2* | 9/2019 | Lee ................... | H04N 5/2257 |
| 10,481,410 B2* | 11/2019 | Kim .................. | H04N 5/23287 |
| 10,594,911 B2* | 3/2020 | Im .................... | H04N 5/2254 |
| 10,678,062 B2* | 6/2020 | Im .................... | G02B 27/646 |
| 10,816,756 B2* | 10/2020 | Lee ................... | G02B 7/1805 |
| 11,119,332 B2* | 9/2021 | Lee ................... | G02B 13/0065 |
| 2009/0045807 A1* | 2/2009 | Nishida ............. | G01D 5/145 324/207.2 |
| 2009/0195898 A1 | 8/2009 | Naitou | |
| 2010/0239237 A1* | 9/2010 | Lee ................... | G03B 17/00 396/55 |
| 2014/0009631 A1 | 1/2014 | Topliss | |
| 2015/0049209 A1 | 2/2015 | Hwang et al. | |
| 2015/0050013 A1 | 2/2015 | Cadugan et al. | |
| 2016/0153547 A1 | 6/2016 | Shibata et al. | |
| 2017/0115466 A1 | 4/2017 | Murakami et al. | |
| 2018/0120674 A1 | 5/2018 | Avivi et al. | |
| 2018/0224665 A1 | 8/2018 | Im et al. | |
| 2018/0259787 A1 | 9/2018 | Kim et al. | |
| 2018/0364450 A1 | 12/2018 | Lee et al. | |
| 2018/0367714 A1 | 12/2018 | Im et al. | |
| 2019/0004328 A1 | 1/2019 | Lee et al. | |
| 2019/0049822 A1* | 2/2019 | Avivi ................ | G03B 5/02 |
| 2019/0258141 A1* | 8/2019 | Park ................. | G03B 19/22 |
| 2019/0268515 A1* | 8/2019 | Im .................... | G02B 13/009 |
| 2019/0361261 A1* | 11/2019 | Lee ................... | G02B 7/08 |
| 2020/0012170 A1* | 1/2020 | Hong ................ | G02B 26/02 |
| 2020/0158793 A1* | 5/2020 | Park ................. | G01R 33/072 |
| 2020/0169665 A1* | 5/2020 | Shin ................. | H04N 5/2258 |
| 2021/0018719 A1* | 1/2021 | Park ................. | G03B 30/00 |
| 2021/0297596 A1* | 9/2021 | Enta ................. | G02B 7/10 |

FOREIGN PATENT DOCUMENTS

| | | |
|---|---|---|
| CN | 106687846 A | 5/2017 |
| CN | 206489312 U | 9/2017 |
| CN | 107533272 A | 1/2018 |
| CN | 108572430 A | 9/2018 |
| CN | 207992659 U | 10/2018 |
| CN | 109151263 A | 1/2019 |
| CN | 109218576 A | 1/2019 |
| CN | 208588884 U | 3/2019 |
| JP | 2009-244353 A | 10/2009 |
| JP | 2010-107440 A | 5/2010 |
| JP | 5124879 B2 | 1/2013 |
| KR | 10-2015-0020950 A | 2/2015 |
| KR | 10-2015-0020951 A | 2/2015 |
| KR | 10-2015-0141247 A | 12/2015 |
| KR | 10-2018-0023336 A | 3/2018 |
| KR | 10-2018-0062732 A | 6/2018 |
| KR | 10-2018-0092251 A | 8/2018 |
| KR | 10-2018-0102946 A | 9/2018 |
| KR | 10-2018-0137277 A | 12/2018 |
| KR | 10-2018-0137278 A | 12/2018 |
| KR | 10-2019-0004121 A | 1/2019 |
| KR | 10-2019-0033035 A | 3/2019 |
| KR | 10-2019-0036372 A | 4/2019 |

OTHER PUBLICATIONS

Korean Office Action dated Nov. 20, 2020 in counterpart Korean Patent Application No. 10-2019-0092229. (9 pages in English) (7 pages in Korean).
Korean Office Action dated Nov. 18, 2020 in the corresponding Korean Patent Application No. 10-2019-0085338.
Korean Office Action dated May 18, 2021 in counterpart Korean Patent Application No. 10-2019-0085338 (6 pages in English)(5 pages in Korean).
Chinese Office Action dated Jun. 1, 2021 issued in counterpart Chinese Patent Application Nos. 202010342033.X (10 pages in English and 12 pages in Chinese).
Chinese Office Action dated Jun. 1, 2021 issued in counterpart Chinese Patent Application No. 202010355478.1 (11 pages in English and 12 pages in Chinese).
Notice of Reason for Rejection dated Nov. 29, 2021 in counterpart Korean Patent Application No. 10-2019-0092229 (5 pages in English and 4 pages in Korean).
Chinese Office Action issued on Jan. 20, 2022, in counterpart Chinese Patent Application No. 202010355478.1 (6 pages in English and 7 pages in Chinese).

* cited by examiner

{Hall Signal = (Hall 1 + Hall 2) − (Hall 3 + Hall 4)}

CAMERA MODULE

CROSS-REFERENCE TO RELATED APPLICATION(S)

This application claims the benefit under 35 USC 119(a) of Korean Patent Application No. 10-2019-0050936 filed on Apr. 30, 2019, and Korean Patent Application No. 10-2019-0085338 filed on Jul. 15, 2019 in the Korean Intellectual Property Office, the entire disclosures of which are incorporated herein by reference for all purposes.

BACKGROUND

1. Field

The following description relates to a camera module.

2. Description of Background

Cameras have generally been installed in portable electronic devices such as tablet personal computers (PCs), laptop computers, and the like, in addition to smartphones, and an autofocusing (AF) function, an optical image stabilization (01S) function, a zoom function, and the like, have been added to cameras for mobile terminals.

For the implementation of various functions, however, structures of camera modules have become complex and sizes of the camera modules have been increased, resulting in portable electronic devices in which camera modules having increased sizes are to be mounted.

Additionally, in the case of directly moving a lens or an image sensor for optical image stabilization, both the weight of the lens or the image sensor itself and those of other members having the lens or the image sensor attached thereto need to be taken into consideration. This requires more than a certain level of driving force, thereby increasing power consumption.

Further, for the implementation of the AF and zoom functions, a certain distance needs to be secured, such that the lens can move in an optical axis direction. However, it may be difficult to implement such a configuration due to the thinness of the camera module.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

A camera module having a simple configuration and a reduced size while implementing functions such as an autofocusing (AF) function, a zoom function, an optical image stabilization (OIS) function, and the like.

A camera module, in spite of having a plurality of lens groups, in which the plurality of lens groups may be easily aligned in an optical axis direction.

A zoom lens and a reflection module is to be provided with a stopper or a damper so as not to be separated from the optimal position.

In order to express performance of a zoom lens to the maximum, it is intended to accurately measure a movement position of the zoom lens by a plurality of position detection sensors, such as Hall sensors.

In one general aspect, a camera module includes a housing; a lens module disposed in an internal space of the housing to be movable in an optical axis direction, and including at least one lens therein; a magnet disposed in the lens module; and position detection sensors configured to detect a position of the magnet. One or more of the position detection sensors are disposed to face a first polarity of the magnet and one or more of the position detection sensors are disposed to face a second polarity of the magnet different than the first polarity.

The magnet may be a two-pole magnet magnetized to have an N pole, a neutral region, and an S pole, or may be a magnet in which individual magnets having an N pole and an S pole are arranged adjacent to each other.

Each of the position detection sensors may be disposed to face only the N pole or the S pole of the magnet.

The position detection sensors include a first position detection sensor disposed to face the N pole, a second position detection sensor disposed to face the S pole, and a third position detection sensor disposed to face a region between the N pole and the S pole.

The position detection sensors may be spaced apart from each other at equal intervals along the optical axis direction.

The camera module may include a coil disposed in the housing and configured to face the magnet, and the position detection sensors may be disposed inside a winding of the coil.

The position of the magnet may be calculated based on position values of all sensing values of the position detection sensors.

The position values may be all different values within a moving range of the magnet.

In another general aspect, a camera module includes a housing; a lens module disposed in an internal space of the housing to be movable in an optical axis direction, including at least one lens therein; a magnet disposed in the lens module and including at least one N pole and at least one S pole that intersect along the optical axis direction; and position detection sensors to detect a position of the magnet. One or more of the position detection sensors are disposed to face a first pole of the magnet and one or more of the position detection sensors are disposed to face a second pole of the magnet.

The magnet may be a three-pole magnet magnetized to have at least three polarities, including the at least one N pole and the at least one S pole, or may be a magnet in which at least three individual magnets each having an N pole and an S pole are arranged adjacent to each other.

The first pole of the magnet may have a same polarity as the second pole of the magnet, and a number of position detection sensors disposed to face the first pole of the magnet may be the same as a number of position detection sensors disposed to face the second pole of the magnet.

The first pole of the magnet may have a same polarity as the second pole of the magnet, the magnet may include a third pole disposed between the first pole and the second pole along the optical axis direction, and the first pole and the second pole may be spaced apart from the third pole by an equal distance along the optical axis direction.

The position detection sensors may include at least four position detection sensors including a first position detection sensor disposed to face a first end of the first pole along the optical axis direction, a second position detection sensor disposed to face a second end of the first pole along the optical axis direction, a third position detection sensor disposed to face a first end of the second pole along the optical axis direction, and a fourth position detection sensor disposed to face a second end of the second pole along the optical axis direction.

The position detection sensors may include a fifth position detection sensor disposed between the first position detection sensor and the second position detection sensor along the optical axis direction and a sixth position detection sensor disposed between the third position detection sensor and the fourth position detection sensor along the optical axis direction.

The position detection sensors may include a first set of position detection sensors spaced apart at equal intervals and disposed to face the first pole along the optical axis direction and a second set of position detection sensors spaced apart at equal intervals and disposed to face the second pole along the optical axis direction.

The camera module may include a first coil fixed to the housing and disposed in the housing to face the first pole of the magnet and a second coil fixed to the housing and disposed in the housing to face the second pole of the magnet. The first pole of the magnet may have a same polarity as the second pole of the magnet.

In another general aspect, a camera module includes a housing; a lens module including at least one lens and configured to move within the housing along an optical axis direction; a magnet disposed in the lens module and including at least two poles that intersect along the optical axis direction; and position detection sensors including at least one position detection sensor disposed to face a first pole of the magnet and at least one position detection sensor disposed to face a second pole of the magnet.

The first pole may have a same polarity as the second pole, the magnet may include a third pole having a different polarity than the first pole and the second pole, and the third pole may be disposed between the first pole and the second pole along the optical axis direction.

The first pole may have a different polarity than a polarity of the second pole.

The position detection sensors may include at least one position detection sensor disposed in a neural region between the first pole and the second pole along the optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
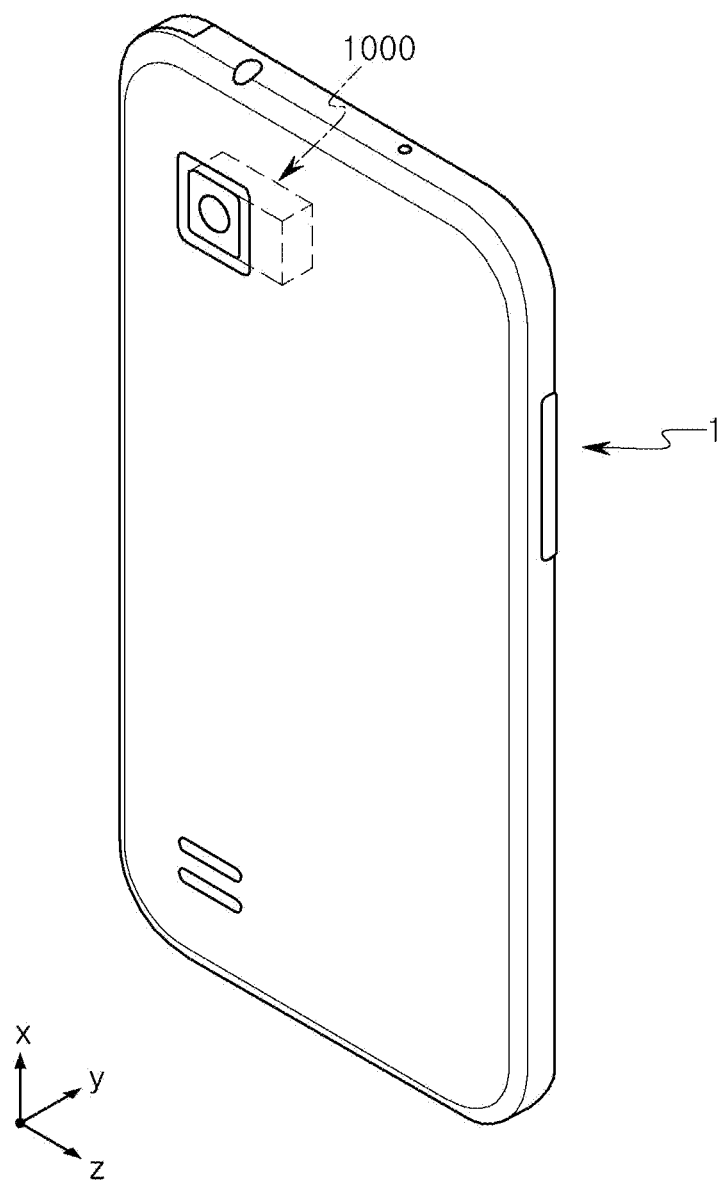
FIG. 1 is a perspective view of a portable electronic device according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a perspective view of a portable electronic device according to an example.

Referring to FIG. 1, a portable electronic device 1 according to an example may be a portable electronic device such as a mobile communications terminal, a smartphone, a tablet personal computer (PC), and the like, in which a camera module 1000 is mounted.

As illustrated in FIG. 1, the portable electronic device 1 may be provided with the camera module 1000 to capture an image of a subject.

In this example, the camera module 1000 may include a plurality of lenses, and an optical axis (a Z-axis) of the lenses may be disposed in a direction perpendicular to a thickness direction (a Y-axis direction, or a direction from a front surface of the portable electronic device to a rear surface thereof, or an opposite direction to the direction from the front surface of the portable electronic device to the rear surface thereof) of the portable electronic device 1.

In an example, the optical axis (the Z-axis) of the plurality of the lenses provided in the camera module 1000 may be formed in a width direction or a length direction of the portable electronic device 1.

Therefore, even when the camera module 1000 has the AF, zoom, and OIS functions, and the like, a thickness of the portable electronic device 1 may be made not to increase. Therefore, the portable electronic device 1 may be made thinner.

The camera module 1000 according to an example may have the AF, zoom, and OIS functions.

The camera module 1000 having the AF, zoom, and OIS functions requires various components, leading to an increased size of the camera module 1000 compared to a conventional camera module.

The increased size of the camera module 1000 may give rise to an issue with respect to the miniaturization of the portable electronic device 1 in which the camera module 1000 is mounted.

For example, the camera module has an increasing number of stacked lenses for the zoom function. When multiple lenses are stacked in the thickness direction of the portable electronic device, the thickness of the portable electronic device may increase, depending on the number of the stacked lenses. Therefore, a sufficient number of the stacked lenses may not be secured without increasing the thickness of the portable electronic device, thereby deteriorating the zoom function.

Further, in order to implement the AF, zoom, and OIS functions, an actuator is required to move a plurality of lens groups in the optical axis direction or a direction perpendicular thereto. When the optical axis (the Z-axis) of the lens groups is formed in the thickness direction of the portable electronic device, the actuator for moving the lens groups should also be installed in the thickness direction. Therefore, the thickness of the portable electronic device may increase.

As the optical axis (the Z-axis) of the plurality of lenses is disposed to be perpendicular to the thickness direction of the portable electronic device 1, the portable electronic device 1 may be made thinner even when the camera module 1000 having the AF, zoom, and OIS functions are mounted.

Figure 2:
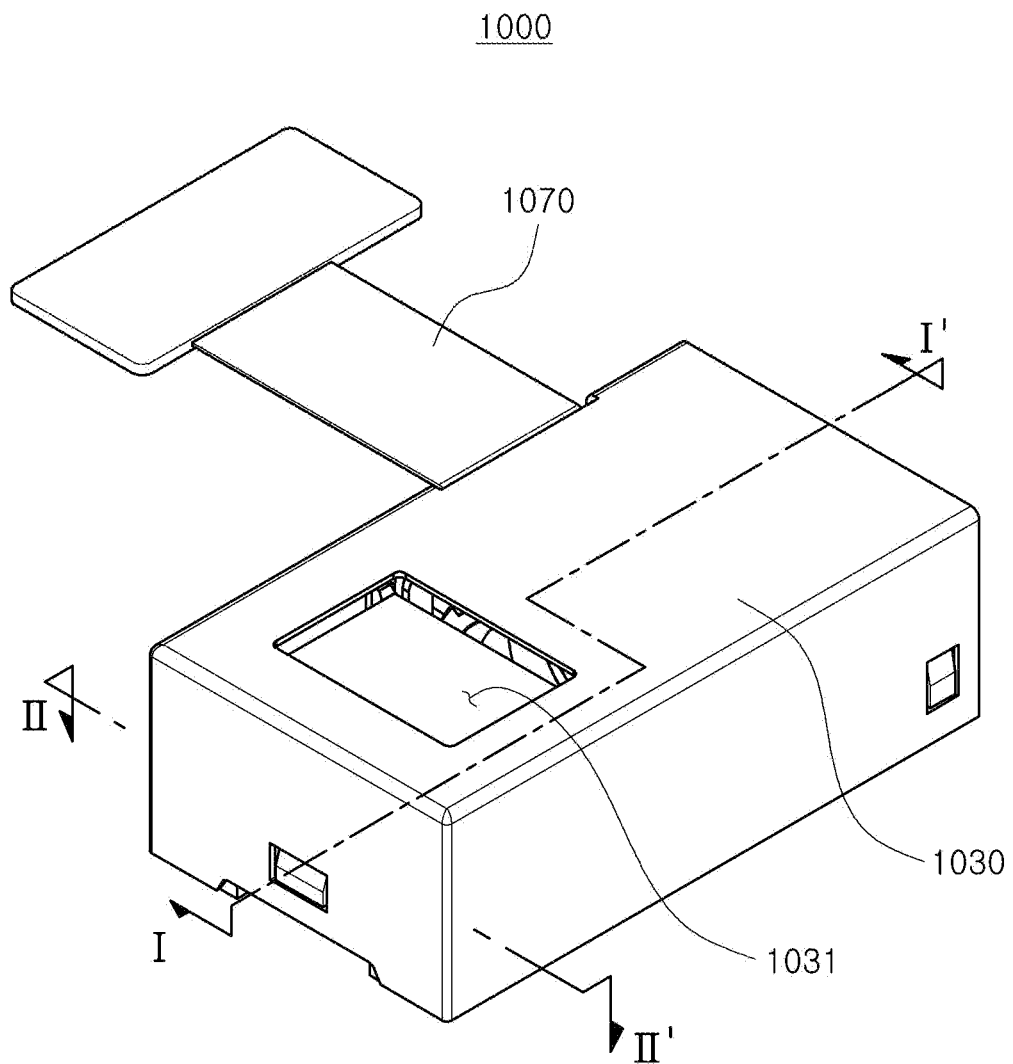
FIG. 2 is a perspective view of a camera module according to an example.
Figure 3A:
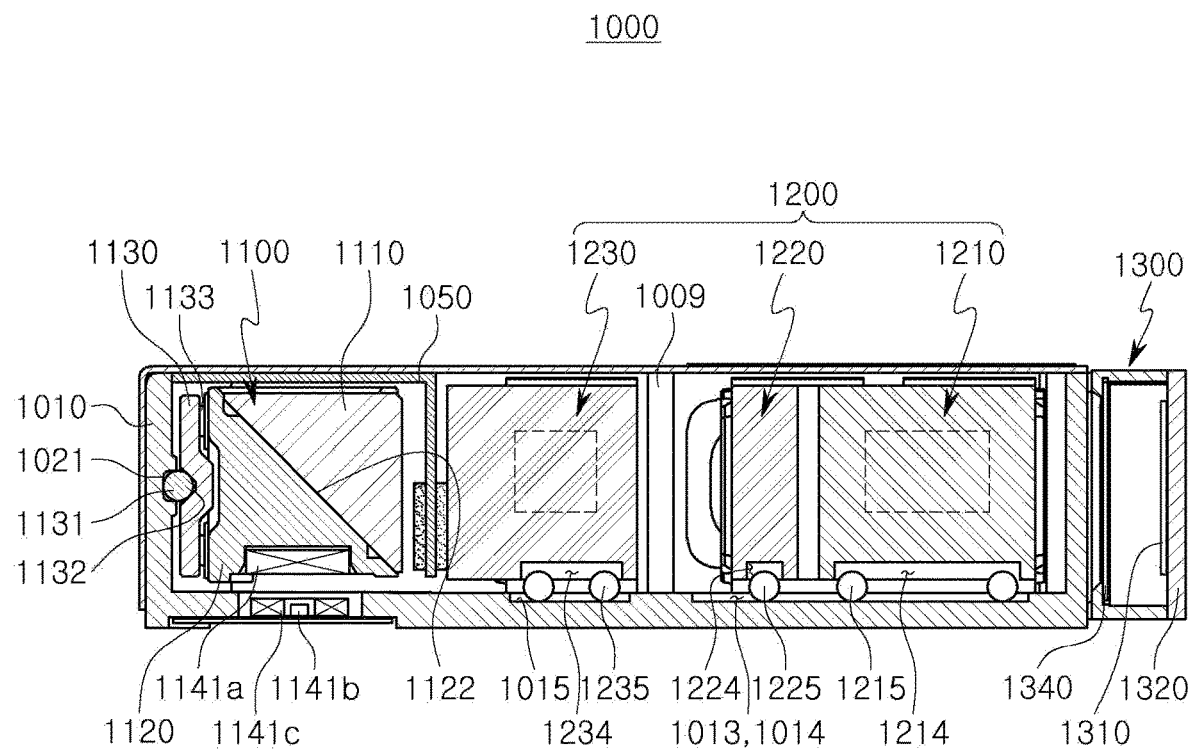
FIGS. 3A and 3B are cross-sectional views of a camera module according to an example.
Figure 3B:
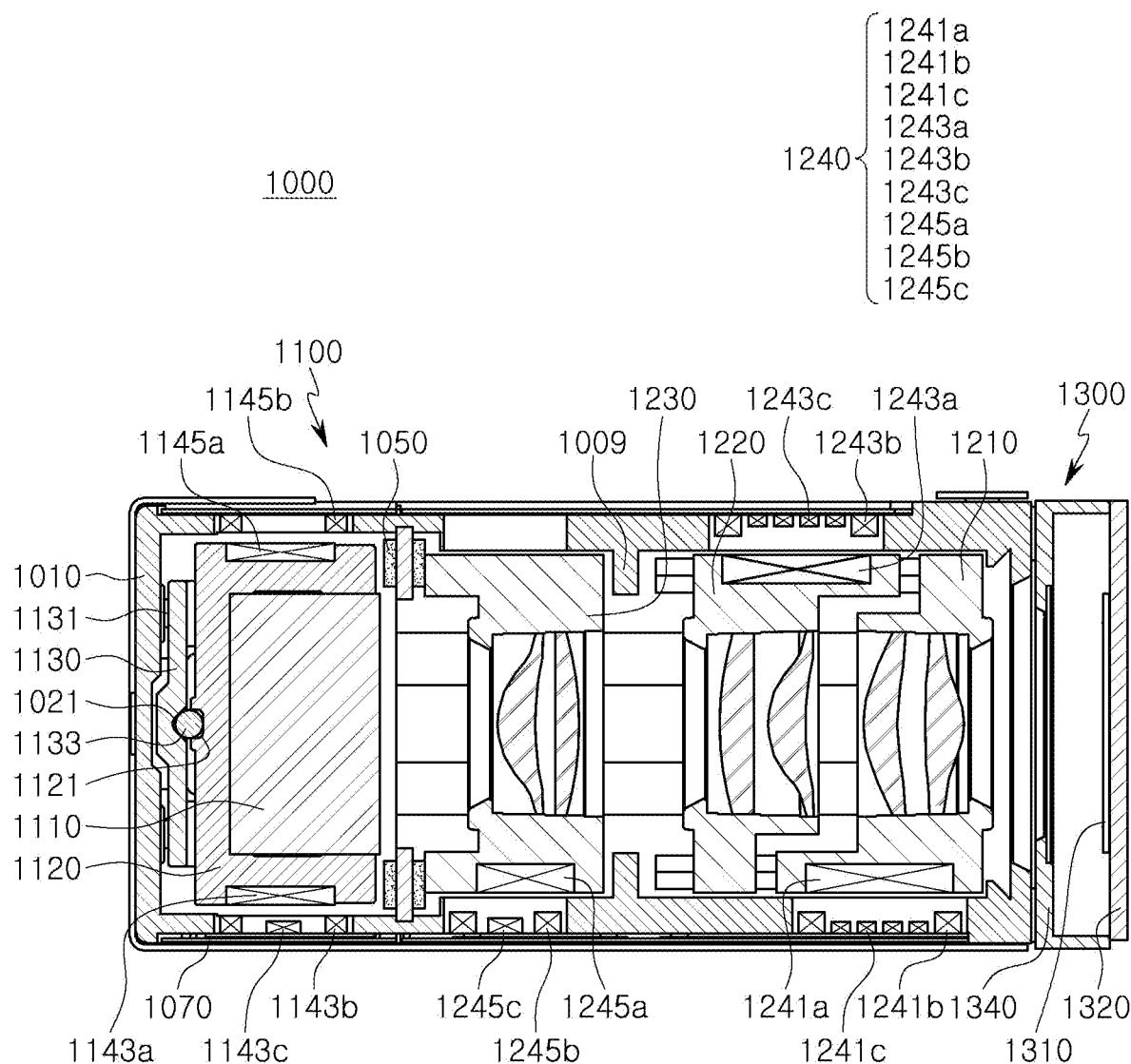
Figure 4:
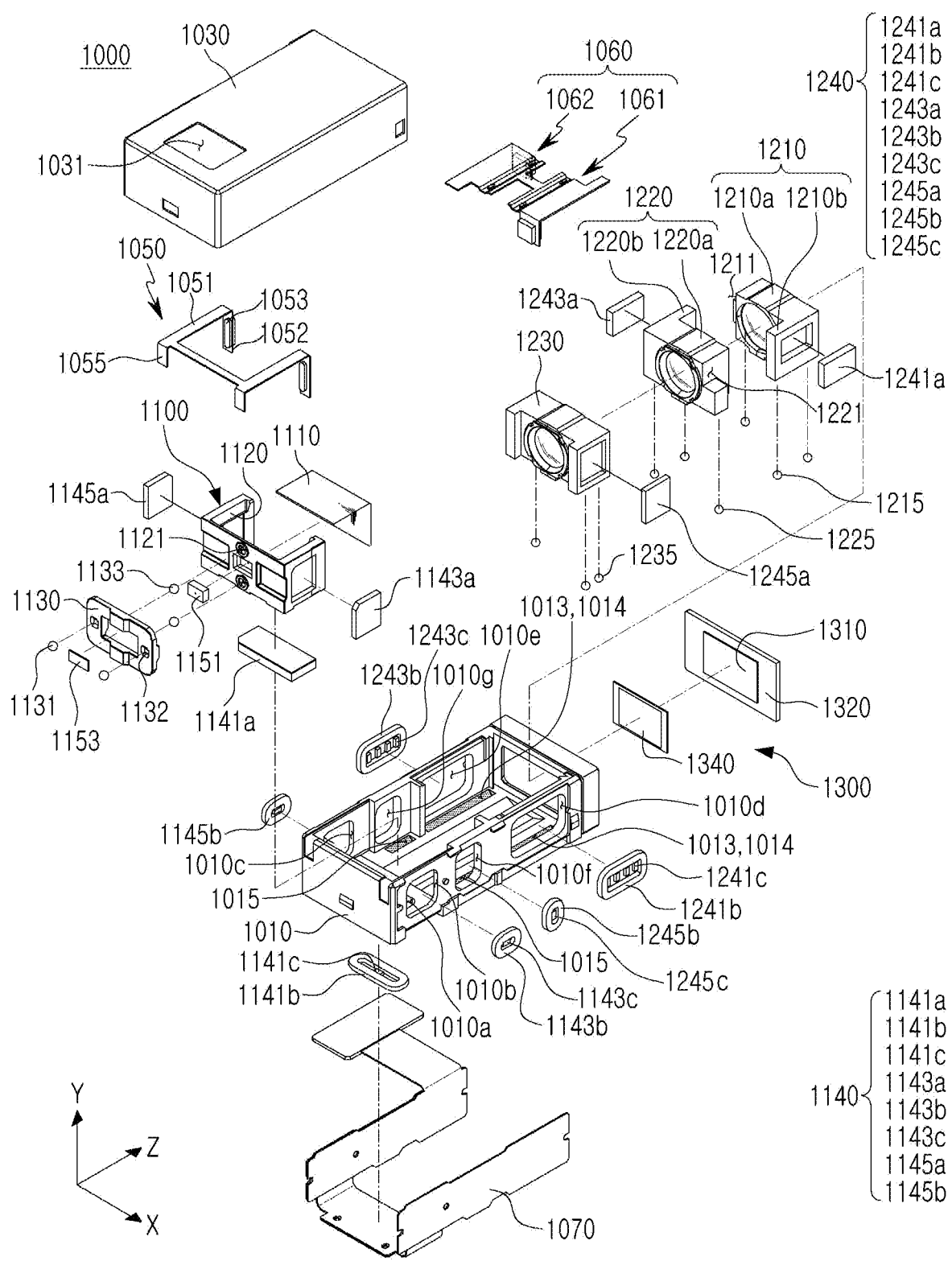
FIG. 4 is an exploded perspective view of a camera module according to an example.
Figure 5:
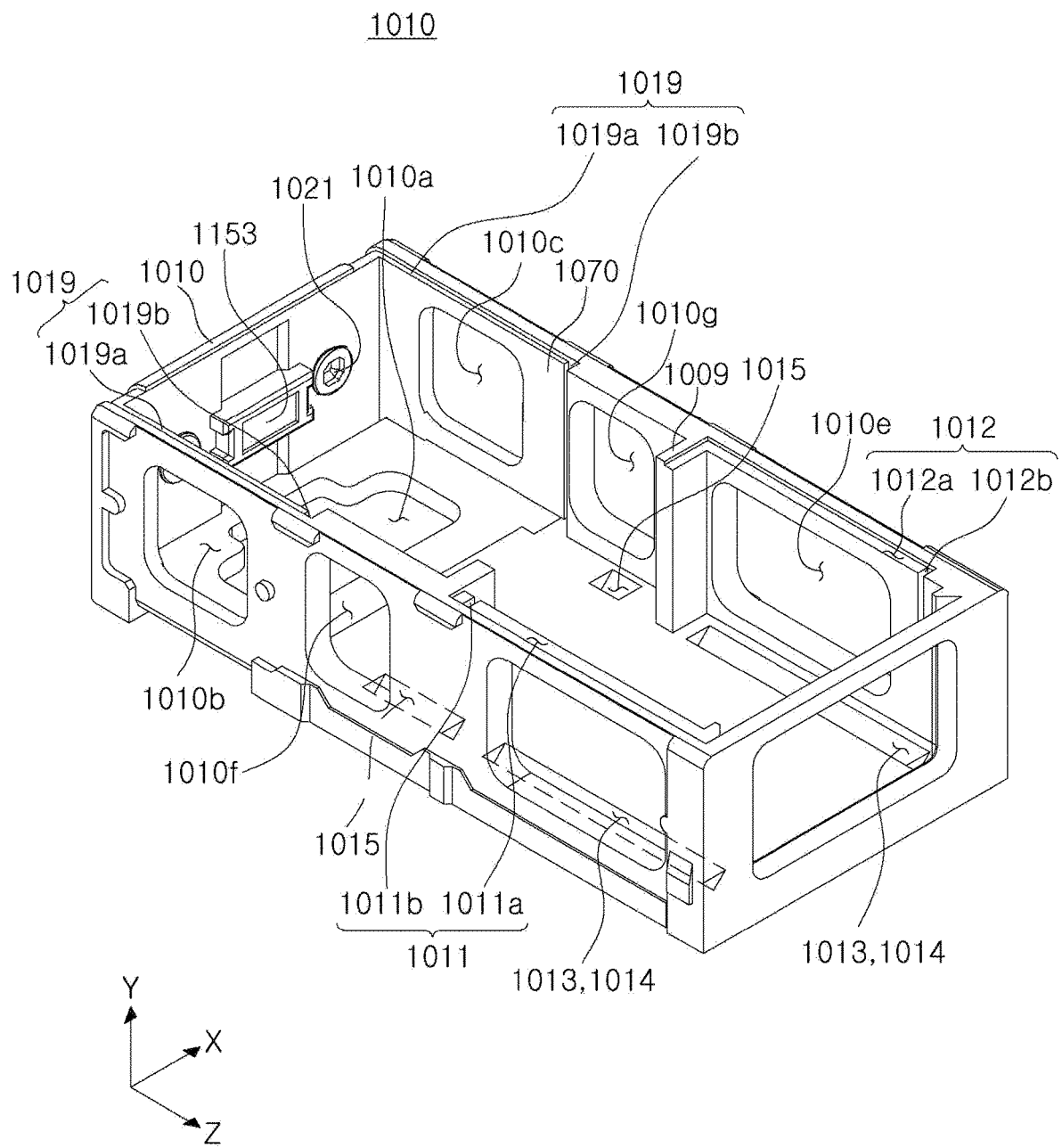
FIG. 5 is an exploded perspective view of a housing of a camera module according to an example.

FIG. 2 is a perspective view of a camera module according to an example, FIGS. 3A and 3B are cross-sectional views of a camera module according to an example, and FIG. 4 is an exploded perspective view of a camera module according to an example.

Referring to FIGS. 2 through 4, the camera module 1000 may include a reflection module 1100, a lens module 1200, and an image sensor module 1300, provided in a housing 1010.

The reflection module 1100 may be configured to change a moving direction of light. As an example, a moving direction of light incident through an opening portion 1031 of a cover 1030 covering an upper portion of the camera module 1000 may be changed to a direction toward the lens module 1200 through the reflection module 1100. To this end, the reflection module 1100 may include a reflective member 1110 configured to reflect the light.

For example, a path of light incident through the thickness direction (the Y-axis direction) of the camera module 1000 may be changed by the reflection module 1100 such that the moving direction of the incident light may be approximately identical to the optical axis (the Z-axis) direction.

The lens module 1200 may include a plurality of lenses through which the light of which the moving direction is changed by the reflection module 1100 passes. The lens module 1200 may include at least three lens barrels 1210, 1220, and 1230. The AF and zoom functions may be implemented according to the movements of the at least three lens barrels 1210, 1220, and 1230 in the optical axis (the Z-axis) direction. In addition, in this example, any one lens barrel, such as lens barrel 1230, of the at least three lens barrels 1210, 1220, and 1230 may be fixed so as not to move in the optical axis direction. The AF and zoom functions may be implemented by the fixed lens barrel 1230, and the remaining two lens barrels 1210 and 1220.

The image sensor module 1300 may include an image sensor 1310 converting the light which has passed through the plurality of lenses into an electrical signal, and a printed circuit board 1320 on which the image sensor 1310 may be mounted. Further, the image sensor module 1300 may include an optical filter 1340 filtering the incident light which has passed through the lens module 1200. The optical filter 1340 may be an infrared cut-off filter.

In an internal space of the housing 1010, the reflection module 1100 may be provided in front of the lens module 1200 (along the Z-axis direction), and the image sensor module 1300 may be provided behind the lens module 1200 (along the Z-axis direction).

Referring to FIGS. 2 through 22, the camera module 1000 may include the reflection module 1100, the lens module 1200, and the image sensor module 1300, which may be provided in the housing 1010.

The reflection module 1100, the lens module 1200, and the image sensor module 1300 may be sequentially provided from one side to the other side in the housing 1010. The housing 1010 may be configured to have an internal space such that all of the reflection module 1100, the lens module 1200, and the image sensor module 1300 may be embedded therein (the printed circuit board 1320 included in the image sensor module 1300 may be attached to an outside of the housing 1010).

For example, as illustrated in the drawings, the housing 1010 may be integrally provided such that the reflection module 1100 and the lens module 1200 may be embedded in the internal space thereof. However, the configuration may not be limited thereto, and for example, separate housings in which the reflection module 1100 and the lens module 1200 are respectively embedded may be connected to each other.

The housing 1010 may be covered with the cover 1030 such that the internal space is not shown.

The cover 1030 may include the opening portion 1031 such that light is incident therethrough, and the moving direction of the light incident through the opening portion 1031 may be changed by the reflection module 1100, leading to light incident on the lens module 1200. The cover 1030 may be integrally provided to cover the entire housing 1010, or divided into and provided as separate members respectively covering the reflection module 1100 and the lens module 1200.

The reflection module 1100 may include the reflective member 1110, reflecting light. Further, the light incident on the lens module 1200 may pass through the plurality of lens groups (at least three lens barrels 1210, 1220, and 1230), and may be then converted into an electrical signal by the image sensor 1310, and stored.

The housing 1010 may include the reflection module 1100 and the lens module 1200 in the internal space. The reflective module 1100 may be provided at a front side of the internal space of the housing 1010, and the lens module 1200 may be provided at a rear side thereof. Spaces in which the lens module 1200 may be provided may be distinguished from each other by a protruding wall 1009. The protruding wall 1009 may be configured to protrude from both side walls of the housing 1010 toward the internal space.

In the case of the reflection module 1100 provided on the front side, a rotation holder 1120 may be closely adhered to and supported on an internal wall surface of the housing 1010 by attractive force between a pulling yoke 1153 provided on the internal wall surface of the housing 1010 and a pulling magnet 1151 provided on the rotation holder 1120. Although not illustrated in the drawings, the housing 1010 may also be provided with a pulling magnet, and the rotation holder 1120 may also be provided with a pulling yoke. Hereinafter, the structure illustrated in the drawings will be described for convenience of explanation.

First ball bearings 1131, a rotation plate 1130, and second ball bearings 1133 may be provided between the internal wall surface of the housing 1010 and the rotation holder 1120.

As will be described in detail below, since the first ball bearings 1131 and the second ball bearings 1133 may be partially fitted to guide grooves 1132, 1134, 1021, and 1121, thereby closely adhering thereto, a small space may be required between the rotation holder 1120 and the protruding walls 1009 when the rotation holder 1120 and the rotation plate 1130 are fitted to the internal space of the housing 1010. When the rotation holder 1120 is mounted on the housing 1010, the rotation holder 1120 may be closely adhered to the internal wall surface of the housing 1010 by the attractive force between the pulling yoke 1153 and the pulling magnet 1151, thereby allowing for a relatively small space to be formed between the rotation holder 1120 and the third lens barrel 1230.

In this example, a damper 1050, which may be fitted to an upper portion of the housing 1010 while supporting the rotation holder 1120, may be included (of course, even without the damper 1050, the pulling magnet 1151 and the pulling yoke 1153 may be fixed manually).

The damper 1050 may include a frame 1051 fitted to the upper portion of the housing 1010, a locking portion 1055, and an extension portion 1052 extending downwardly from the frame 1051 (for example, in the Y-axis direction). The extension portion 1052 may include a damping material 1053 to protrude toward the rotation holder 1120 in the optical axis direction. The damping material 1053 may be provided to be fitted into a through-hole provided in the extension portion 1052, and the damping material 1053 may be any material as long as it is an elastic material such as urethane, silicone, epoxy, a polymer material, or the like.

The locking portion 1055 may be locked as fitted to the outside of the housing 1010. The housing may be provided with an insertion groove 1019 (see FIG. 5, for example) into which the frame 1051 and the extension portion 1052 are fitted. The insertion groove 1019 may include a first insertion groove 1019a provided along an internal side of an upper edge of the housing 1010, a second insertion groove 1019b extending downwardly perpendicular to the optical axis direction from the other end of the first insertion groove 1019a, and a third insertion groove 1019c (see FIG. 12, for example) provided at one end of the first insertion groove 1019a along the outside of the housing 1010.

Since the frame 1051 may be fitted into the first insertion groove 1019a, the locking portion 1055 provided at one end of the frame 1051 may be fitted to the outside of the housing 1010, and the extension portion 1052 provided at the other side end of the frame 1051 may be fitted into the second insertion groove 1019b, the frame 1051 may be firmly fixed so as not to move in the optical axis direction. In addition, an adhesive may be applied between the frame 1051 and the housing 1010 to be further bonded to each other.

The damping material 1053 may be provided to be fitted in a through-hole provided in the extension portion 1052 (of course, the damping material 1053 may be attached to one side or both sides of the extension portion 1052 by bonding with an adhesive). The damping material 1053 may be provided to protrude to both sides of the extension portion 1052. The damping material 1053 may serve as a damper for absorbing the shock of the rotation holder 1120 or a stopper for limiting the moving distance, and the third lens barrel 1230 may be fixed (FIG. 6B). In this case, the third lens barrel 1230 may serve to support the one side in the optical axis direction.

The damper 1050 may serve as a bracket supporting the rotation holder 1120 when the reflection module 1100 is not driven, and may serve as a damper or a stopper controlling movements of the rotation holder 1120 when the reflection module 1100 is driven. A space may be provided between the damper 1050 and the rotation holder 1120 such that the rotation holder 1120 rotates smoothly. Alternatively, even when the damper 1050 is in contact with the rotation holder 1120, the damper 1050 may be formed of an elastic material to allow the rotation holder 1120 to move smoothly while being supported by the damper 1050.

The housing 1010 may include a first driving portion 1140 and a second driving portion 1240, provided to respectively drive the reflection module 1100 and the lens module 1200. The first driving portion 1140 may include a plurality of coils 1141b, 1143b, and 1145b for driving the reflection module 1100, and the second driving portion 1240 may include a plurality of coils 1241b, 1243b, and 1245b for driving the lens module 1200, where the lens module 1200 may include the first lens barrel 1210, the second lens barrel 1220, and the third lens barrel 1230.

Further, since the plurality of coils 1141b, 1143b, 1145b, 1241b, 1243b, and 1245b may be provided in the housing 1010 in a state in which they are mounted on a main board 1070, the housing 1010 may be provided with a plurality of through-holes 1010a, 1010b, 1010c, 1010d, 1010e, 1010f and 1010g, such that the plurality of coils 1141b, 1143b, 1145b, 1241b, 1243b, and 1245b may be exposed to the internal space of the housing 1010.

The main board 1070 on which the coils 1141b, 1143b, 1145b, 1241b, 1243b, and 1245b may be mounted may be entirely connected to each other to be provided as a single board, as illustrated in the drawings. In this case, a single terminal may be provided, thereby making it easy to connect an external power supply. The main board 1070 is not limited to such a configuration, and may also be provided as a plurality of boards by separating a board on which coils for the reflection module 1100 are mounted from a board on which coils for the lens module 1200 are mounted.

The reflection module 1100 may change a path of light incident through the opening portion 1031. When a still image or a moving image may be captured, the still image may be blurred or the moving image may be shaken due to hand-shake or other user movement. In this case, the reflection module 1100 may stabilize the hand-shake or other user movement by moving the rotation holder 1120 on which the reflective member 1110 is mounted. For example, when shaking is generated at the time of capturing a still image or a moving image due to a hand-shake or other movement of a user, a relative displacement corresponding to the shaking may be provided to the rotation holder 1120 to compensate for the shaking.

The OIS function may be implemented by a movement of the rotation holder 1120 having a relatively low weight, as it does not include lenses or the like, and thus power consumption for the OIS function may be significantly reduced.

For example, for the OIS function implementation, the moving direction of the light may be changed by moving the rotation holder 1120 on which the reflective member 1110 is provided without moving a lens barrel including a plurality of lenses or the image sensor such that the light on which the OIS is performed may be incident to the lens module 1200.

The reflection module 1100 may include the rotation holder 1120 provided to be supported by the housing 1010, the reflective member 1110 mounted on the rotation holder 1120, and the first driving portion 1140 moving the rotation holder 1120.

The reflective member 1110 may change a moving direction of light. For example, the reflective member 1110 may be a mirror or a prism reflecting the light (for convenience of explanation, the reflective member 1110 may be illustrated, as a prism in the drawings).

The reflective member 1110 may be fixed to the rotation holder 1120. The rotation holder 1120 has a mounting surface 1122 on which the reflective member 1110 is mounted.

The mounting surface 1122 of the rotation holder 1120 may be an inclined surface such that a path of light changes. The mounting surface 1122 may be a surface inclined with respect to the optical axis (the Z-axis) of the plurality of the lenses by 30° to 60°. The inclined surface of the rotation holder 1120 may be directed toward the opening portion 1031 of the cover 1030 on which the light is incident.

The rotation holder 1120 on which the reflective member 1110 is mounted may be mounted to be movable in the internal space of the housing 1010. For example, the rotation holder 1120 may be mounted in the housing 1010 to be rotatable around a first axis (the X-axis) and a second axis (the Y-axis). The first axis (the X-axis) and the second axis (the Y-axis) may refer to axes perpendicular to the optical axis (the Z-axis), and may be perpendicular to each other.

The rotation holder 1120 may be supported in the housing 1010 by the first ball bearings 1131 aligned along the first axis (the X-axis) and the second ball bearings 1133 aligned along the second axis (the Y-axis) such that the rotation holder 1120 rotates smoothly around the first axis (the X-axis) and the second axis (the Y-axis). As an example, two first ball bearings 1131 aligned along the first axis (the X-axis) and two second ball bearings 1133 aligned along the second axis (the Y-axis) are be illustrated in the drawings. The rotation holder 1120 may rotate around the first axis (the X-axis) and the second axis (the Y-axis) by the first driving portion 1140, as described below.

Further, the first ball bearings 1131 and the second ball bearings 1133 may be provided on a front surface and a rear surface of the rotation plate 1130, respectively (or alternatively, the first ball bearings 1131 and the second ball bearings 1133 may be provided on a rear surface and a front surface of the rotation plate 1130, respectively; that is, the first ball bearings 1131 may be aligned along the second axis (the Y-axis) and the second ball bearings 1133 may be aligned along the first axis (the X-axis); the structure illustrated in the drawing will hereinafter be described for convenience of explanation). The rotation plate 1130 may be provided between the rotation holder 1120 and the internal surface of the housing 1010.

The rotation holder 1120 may be supported in the housing 1010 via the rotation plate 1130 by the attractive force between the pulling magnet 1151 or the pulling yoke provided on the rotation holder 1120 and the pulling yoke 1153 or the pulling magnet provided on the housing 1010 (the first ball bearings 1131 and the second ball bearings 1133 may be also provided between the rotation holder 1120 and the housing 1010).

The guide grooves 1132 and 1134 may be provided on the front surface and the rear surface of the rotation plate 1130 such that the first ball bearings 1131 and the second ball bearings 1133 are inserted, respectively. The guide grooves 1132 and 1134 may include first guide grooves 1132 into which the first ball bearings 1131 are partially inserted, and second guide grooves 1134 into which the second ball bearings 1133 are partially inserted.

The housing 1010 may be provided with third guide grooves 1021 into which the first ball bearings 1131 are partially inserted, and the rotation holder 1120 may be provided with fourth guide grooves 1121 into which the second ball bearings 1133 are partially inserted.

The first guide grooves 1132, the second guide grooves 1134, the third guide grooves 1021, and the fourth guide grooves 1121 described above may be provided in a hemispherical or polygonal (polyprismatic or polypyramidal) groove shape such that the first ball bearings 1131 and the second ball bearings 1133 may easily rotate therein.

The first ball bearings 1131 and the second ball bearings 1133 may serve as bearings while rolling or sliding in the first guide grooves 1132, the second guide grooves 1134, the third guide grooves 1021, and the fourth guide grooves 1121.

Figure 8A:
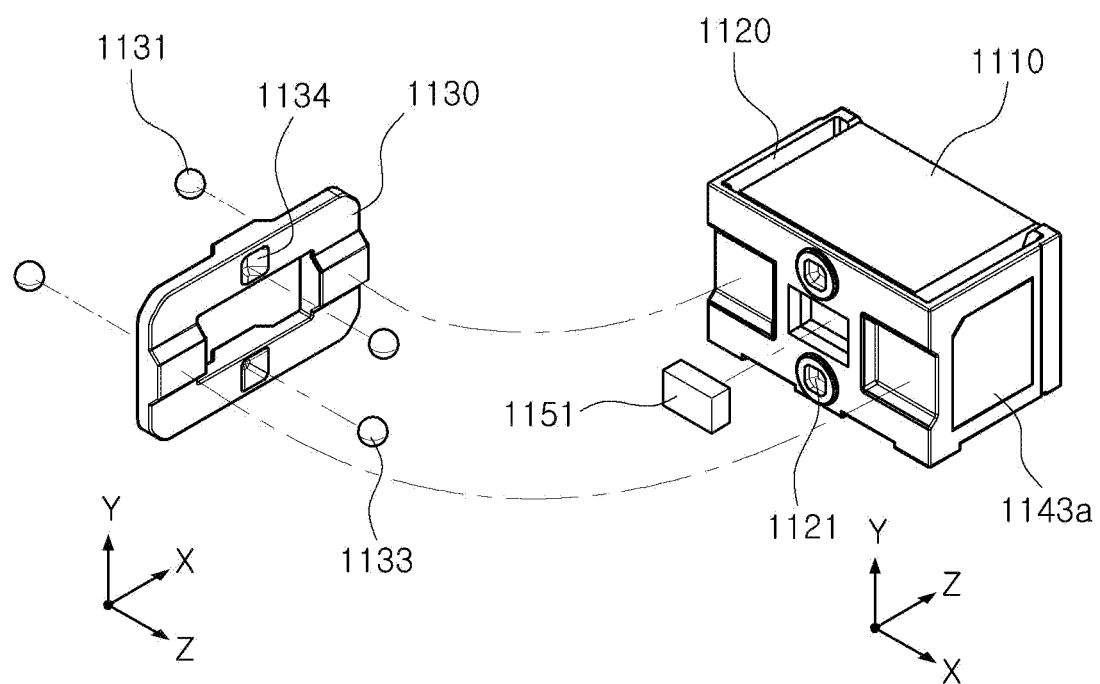
FIG. 8A is an exploded perspective view of a rotation plate and a rotation holder in a camera module according to an example.
Figure 8B:
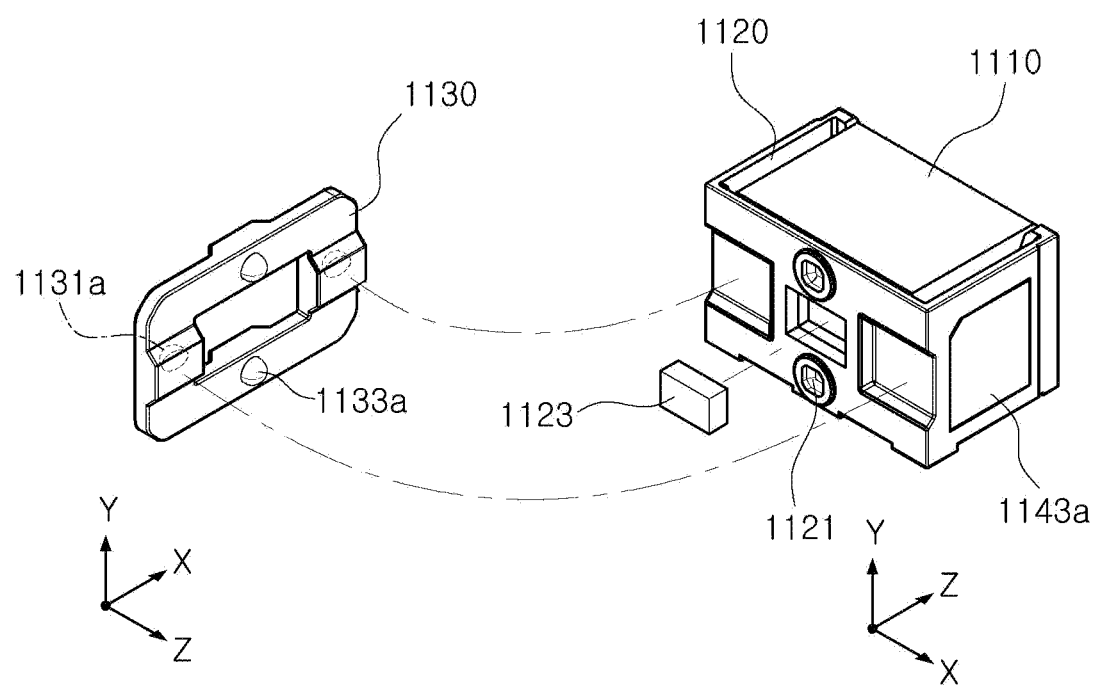
FIG. 8B is an exploded perspective view of a rotation plate and a rotation holder in a camera module according to another example.
Figure 9A:
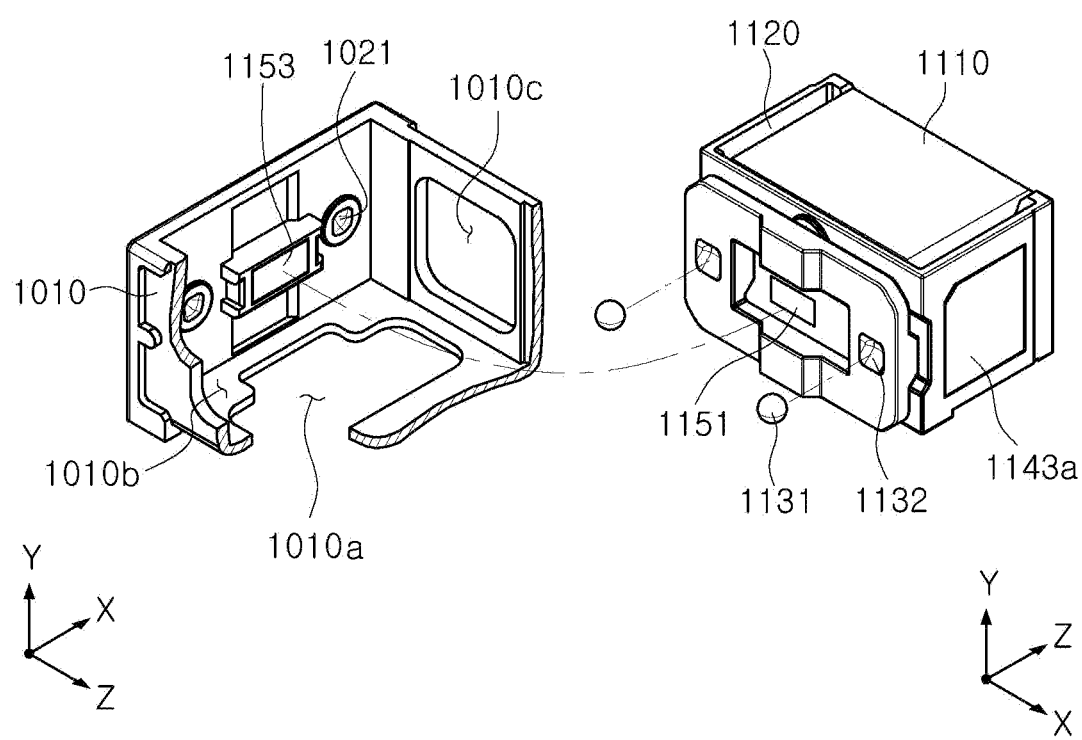
FIG. 9A is an exploded perspective view of a housing and a rotation holder in a camera module according to an example.
Figure 9B:
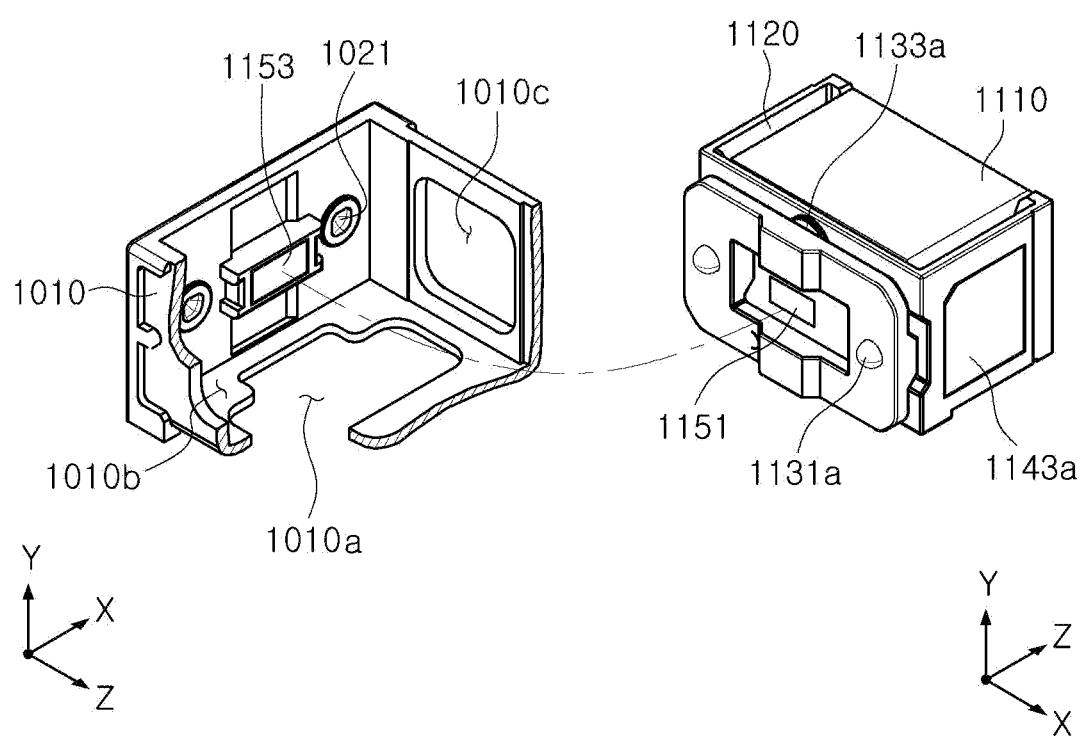
FIG. 9B is an exploded perspective view of a housing and a rotation holder in a camera module according to another example.
Figure 10:
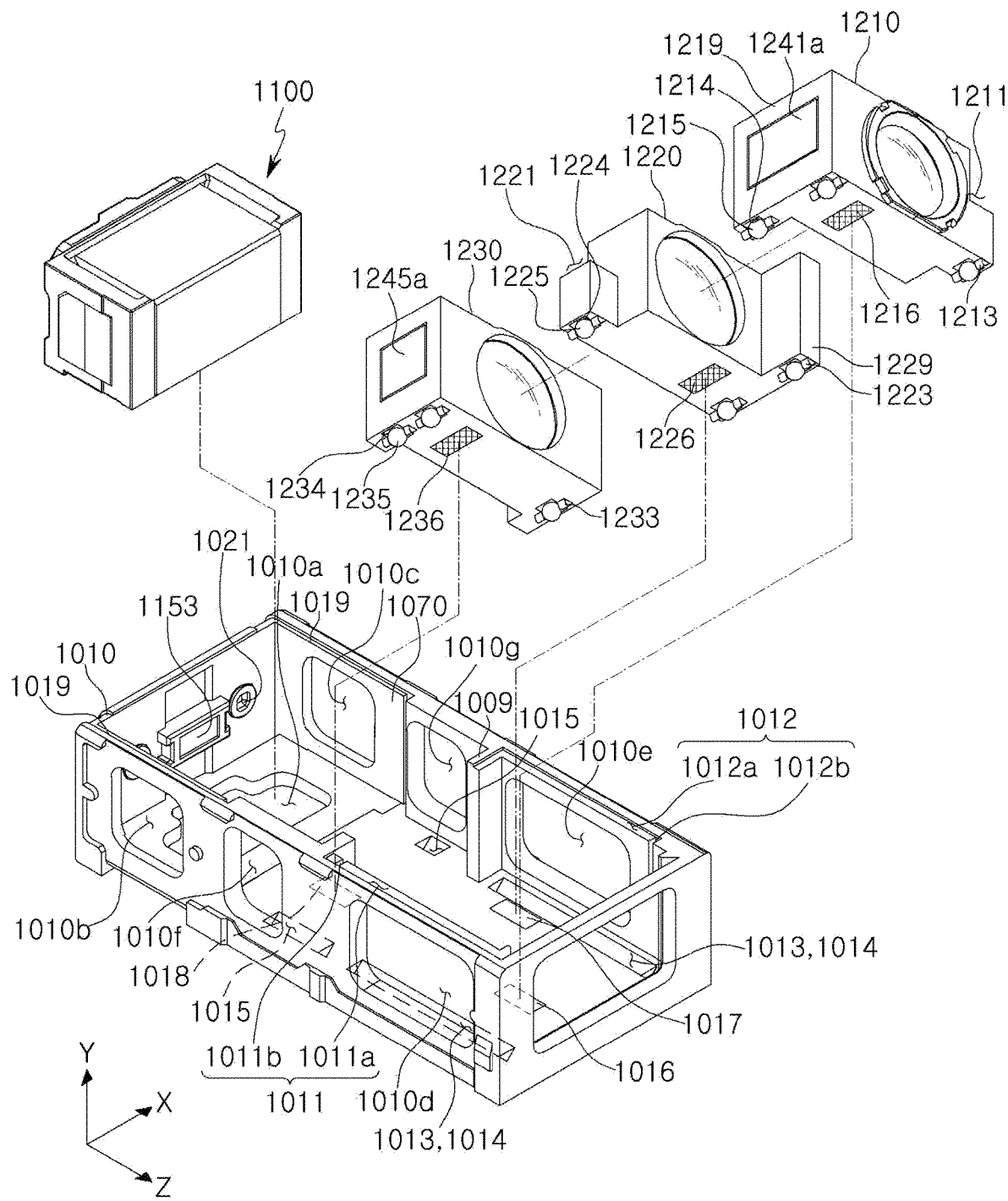
FIG. 10 is an exploded perspective view of a housing and a lens barrel according to an example.
Figure 11:
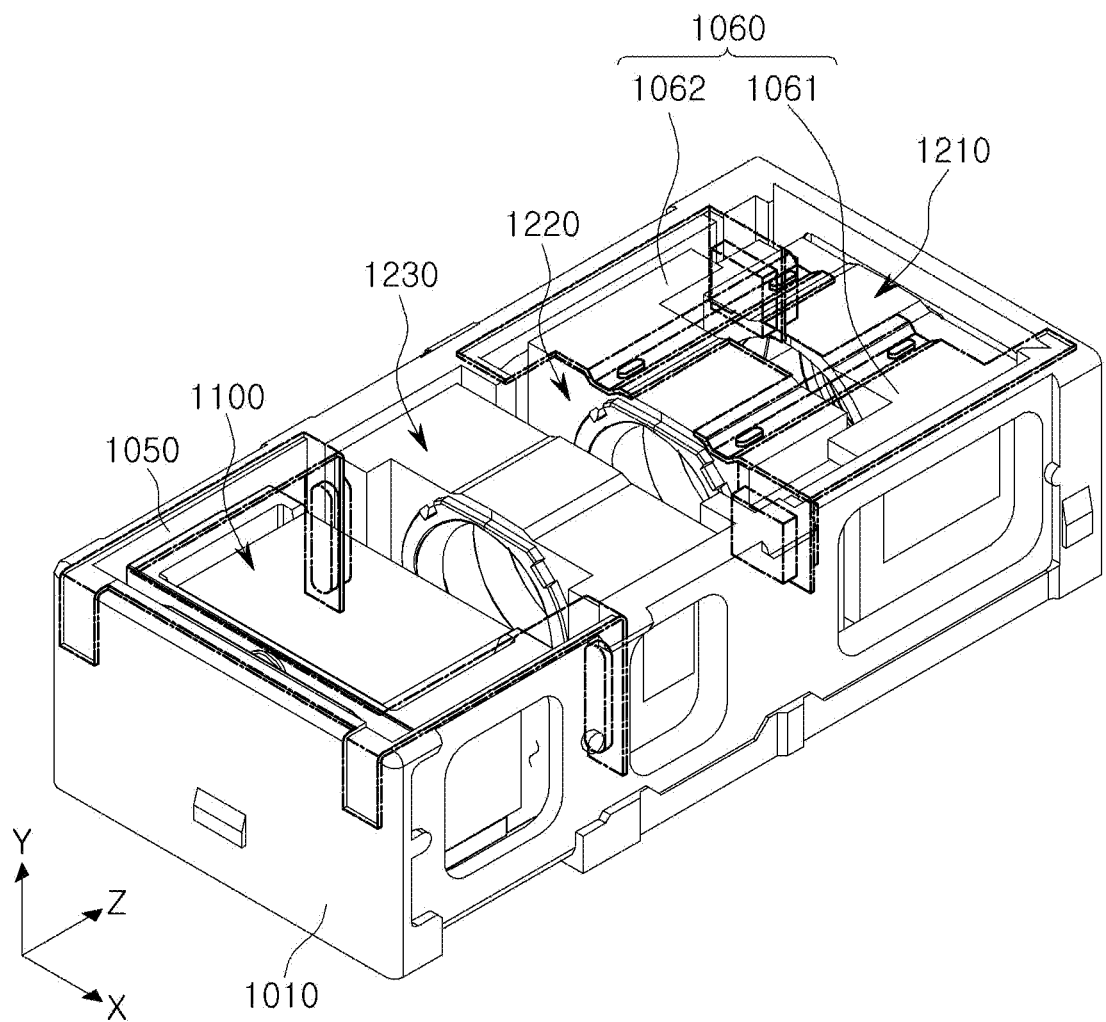
FIG. 11 is a perspective view illustrating a damper of a rotation holder and a stopper of a zoom lens, installed according to an example.
Figure 12:
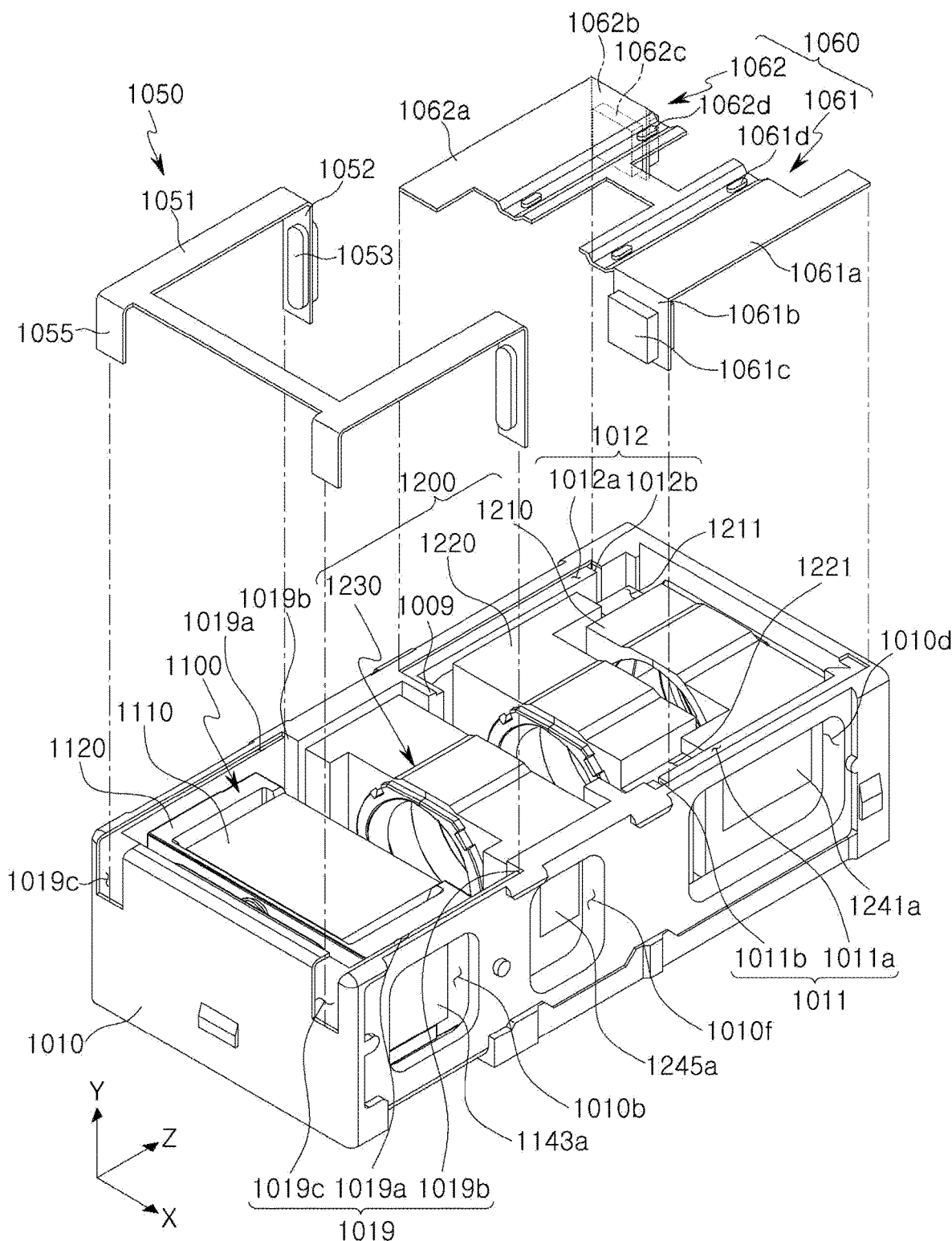
FIG. 12 is an exploded perspective view in which the damper of the rotation holder and the stopper of the zoom lens in FIG. 11 are disassembled.

As illustrated in FIGS. 8B and 9B, the first ball bearings 1131*a* and the second ball bearings 1133*a* may be fixed to both surfaces of the rotation plate 1130, respectively.

The configuration is not limited thereto, and the first ball bearings 1131*a* and the second ball bearings 1133*a* may have a structure in which they may be fixedly provided in at least one of the housing 1010, the rotation plate 1130, and the rotation holder 1120. For example, the first ball bearings 1131*a* may be fixedly provided in the housing 1010 or on the rotation plate 1130, and the second ball bearings 1133*a* may be fixedly provided on the rotation plate 1130 or the rotation holder 1120. In this case, only a member facing a member in which the first ball bearings 1131*a* or the second ball bearings 1133*b* are fixedly provided may be provided with the guide grooves, and the ball bearings may serve as friction bearings by sliding rather than rotating.

Further, the first ball bearings 1131 and the second ball bearings 1133 may be separately manufactured and then attached to any one of the housing 1010, the rotation plate 1130 and the rotation holder 1120. Alternatively, the first ball bearings 1131 and the second ball bearings 1133 may be provided integrally with the housing 1010, the rotation plate 1130, or the rotation holder 1120 at the time of manufacturing the housing 1010, the rotation plate 1130, or the rotation holder 1120.

The first driving portion 1140 generates driving force such that the rotation holder 1120 may be rotatable around the two axes.

As an example, the first driving portion 1140 may include a plurality of magnets 1141*a*, 1143*a*, and 1145*a*, and the plurality of coils 1141*b*, 1143*b*, and 1145*b* arranged to face the plurality of magnets 1141*a*, 1143*a*, and 1145*a*, respectively.

When power is applied to the plurality of coils 1141*b*, 1143*b*, and 1145*b*, the rotation holder 1120 on which the magnets 1141*a*, 1143*a*, and 1145*a* may be mounted may be rotated around the first axis (the X-axis) and the second axis (the Y-axis) by an electromagnetic effect between the plurality of magnets 1141*a*, 1143*a*, and 1145*a*, and the plurality of coils 1141*b*, 1143*b*, and 1145*b*.

The plurality of magnets 1141*a*, 1143*a*, and 1145*a* may be mounted on the rotation holder 1120. As an example, the magnet 1141*a* may be mounted on a lower surface of the rotation holder 1120, and the remaining magnets 1143*a* and 1145*a* may be mounted on side surfaces of the rotation holder 1120.

The plurality of coils 1141*b*, 1143*b*, and 1145*b* may be mounted on the housing 1010. As an example, the plurality of coils 1141*b*, 1143*b*, and 1145*b* may be mounted on the housing 1010 through the main board 1070. The plurality of coils 1141*b*, 1143*b*, and 1145*b* may be provided on the main board 1070, while the main board 1070 may be mounted on the housing 1010.

In the drawings, an example in which the main board 1070 may be integrally provided such that both the coils for the reflection module 1100 and those for the lens module 1200 may be mounted thereon is illustrated. The main board 1070 may be provided as at least two separate boards on which the coils for the reflection module 1100 and the coils for the lens module 1200 may be mounted, respectively.

A closed loop control method involving sensing a position of the rotation holder 1120 and providing feedback may be used when rotating the rotation holder 1120.

Therefore, position detection sensors 1141*c* and 1143*c* may be required for the closed loop control. The position detection sensors 1141*c* and 1143*c* may be Hall sensors.

The position detection sensors 1141*c* and 1143*c* may be disposed inside or outside of the coils 1141*b* and 1143*b*, respectively, and may be mounted on the main board 1070 on which each of the coils 1141*b* and 1143*b* is mounted.

The main board 1070 may be provided with a gyro sensor (not illustrated) sensing a shaking factor such as a handshake or other user movement, and may be provided with a driver integrated circuit (IC; not illustrated) providing a driving signal to the plurality of coils 1141b, 1143b, and 1145b.

When the rotation holder 1120 rotates around the first axis (the X-axis), the rotation plate 1130 may rotate around the first ball bearings 1131 arranged along the first axis (the X-axis), which makes the rotation holder 1120 rotate as well (in this case, the rotation holder 1120 may not move relative to the rotation plate 1130).

Further, when the rotation holder 1120 rotates around the second axis (the Y-axis), the rotation holder 1120 rotates around the second ball bearings 1133 arranged along the second axis (the Y-axis) (in this case, the rotation plate 1130 may not rotate, and the rotation holder 1120 may thus move relative to the rotation plate 1130).

For example, when the rotation holder 1120 rotates around the first axis (the X-axis), the first ball bearings 1131 may operate, and when the rotation holder 1120 rotates around the second axis (the Y-axis), the second ball bearings 1133 may operate. This is because, as illustrated in the drawings, the second ball bearings 1133 aligned along the second axis (the Y-axis) cannot move while being fitted into the guide grooves 1134 and 1121 when the rotation holder 1120 rotates around the first axis (the X-axis), and the first ball bearings 1131 aligned along the first axis (the X-axis) cannot move while being fitted into the guide grooves 1021 and 1132 when the rotation holder 1120 rotates around the second axis (the Y-axis).

The light which has reflected on the reflection module 1100 may be incident on the lens module 1200. The incident light may be implemented by the AF or zoom function by moving the optical axis direction (Z-axis) of at least three lens barrels 1210, 1220, and 1230 provided in the lens module 1200.

Figure 6A:
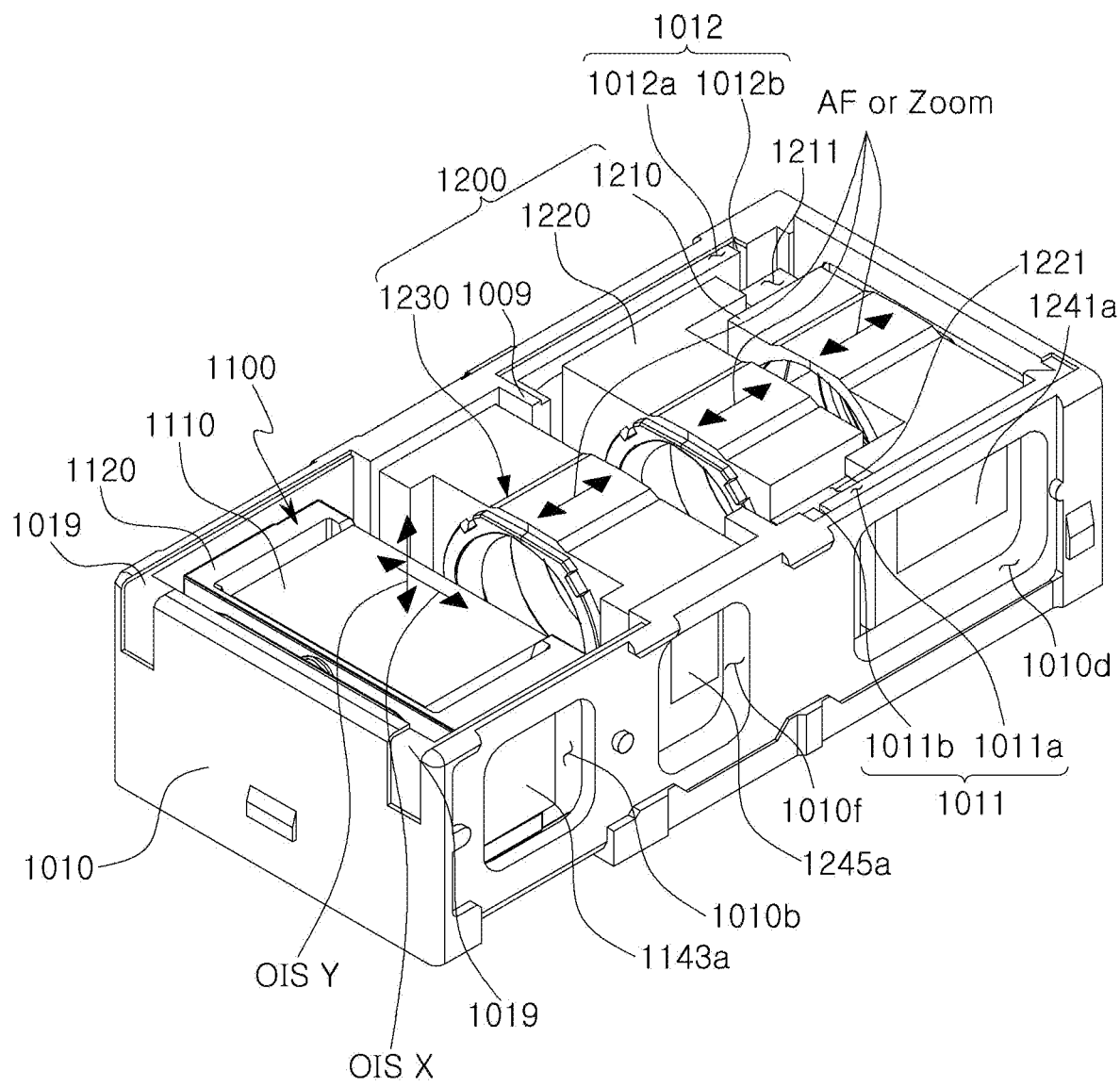
FIG. 6A is perspective views of a reflection module and a lens module coupled to a housing of a camera module according to an example.
Figure 6B:
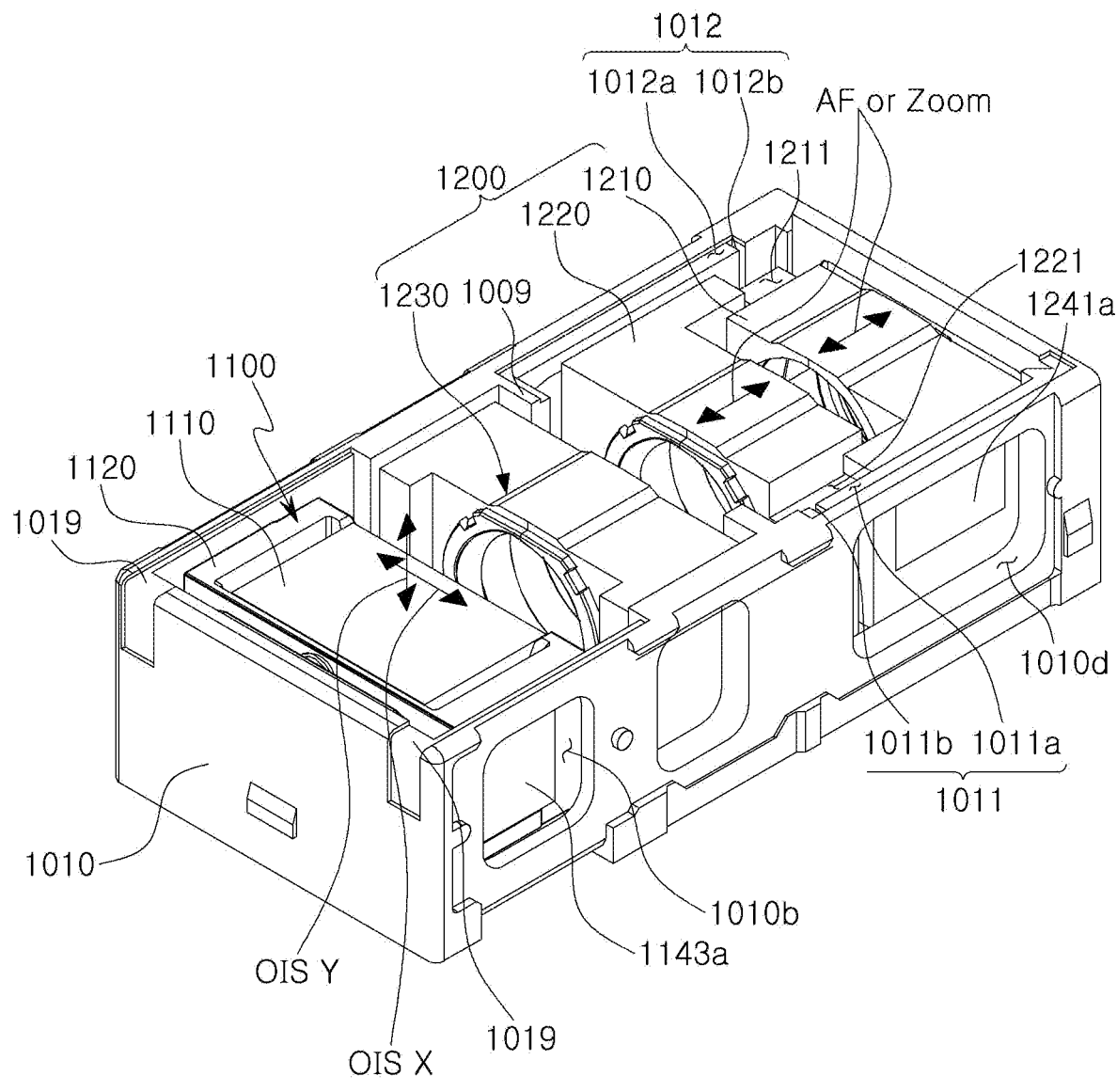
FIG. 6B is perspective views of a reflection module and a lens module coupled to a housing of a camera module according to another example.
Figure 7:
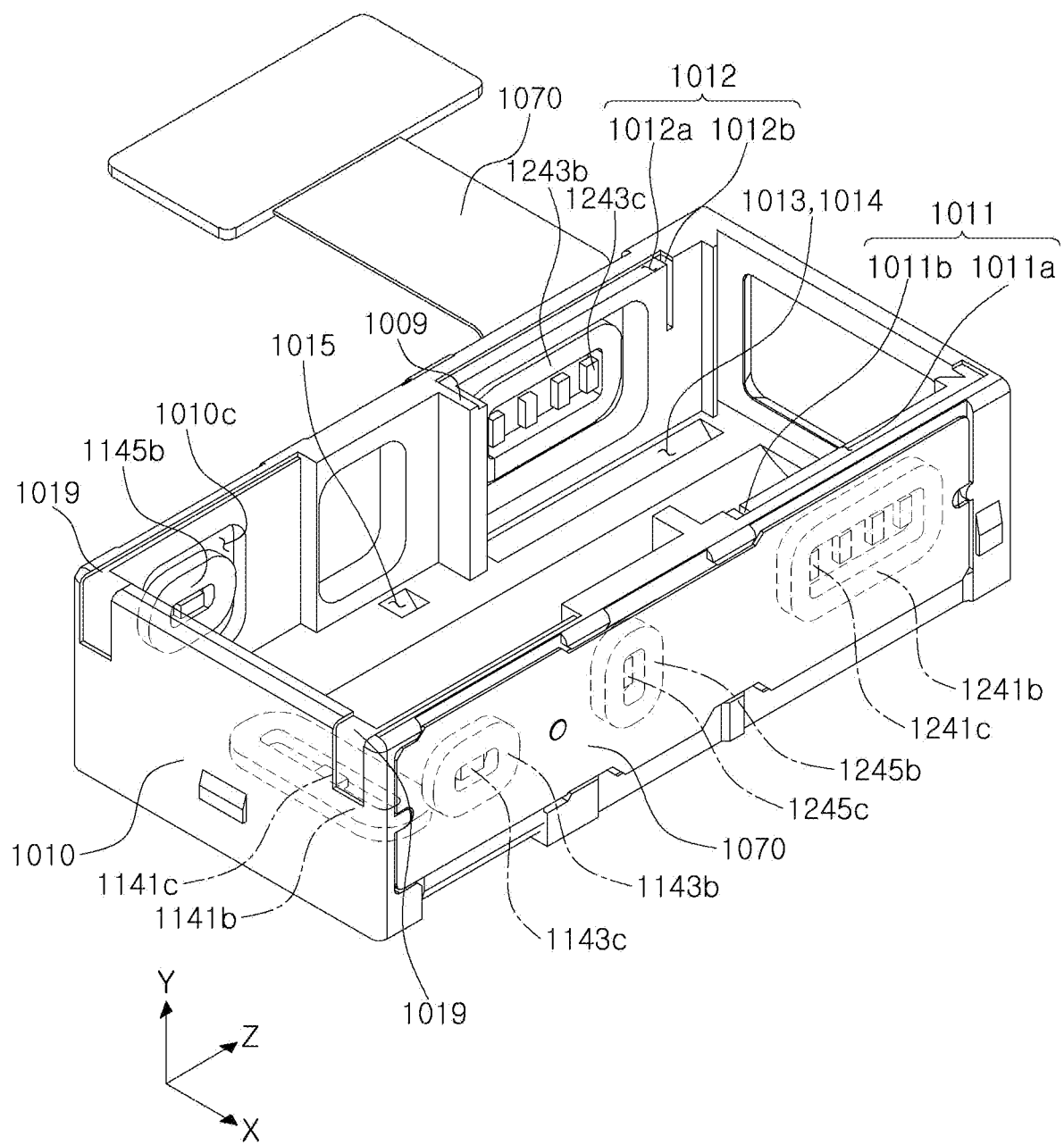
FIG. 7 is a perspective view of a board having driving coils and sensors mounted thereon, coupled to a housing of a camera module according to an example.

Referring to FIG. 6A, the two lens barrels 1210 and 1220 at the rear may be responsible for the zoom function, and the lens barrel 1230 at the front may be responsible for the AF function. Further, the three lens barrels 1210, 1220, and 1230 may be responsible for the zoom and AF functions in various combinations.

Various deformations may be additionally controlled. Referring to FIG. 6B, for example, the rear two lens barrels 1210 and 1220, individually or in common, perform the zoom or AF function, where, for example, the two lens barrels 1210 and 1220 combine to perform the zoom function, and the lens barrel 1210 at the rearmost may be further responsible for the AF function, and the front lens barrel 1230 may remain fixed to the housing 1010. Further, although not illustrated in the drawings, any one of the three lens barrels 1210, 1220, and 1230 may remain fixed to the housing 1010 while the remaining two lens barrels may be responsible for the zoom or AF function, individually or in common. In this case, the lens barrel (for example, lens barrel 1230) fixed to the housing 1010 does not require ball bearings or the like interposed between a driving magnet or a coil facing thereto and the housing 1010.

The housing may be configured to include a space in which the one front lens barrel 1230 and two rear lens barrels 1210 and 1220 may be partitioned by the protruding wall 1009, but may be not limited to such a configuration. The three lens barrels 1210, 1220, and 1230 may be provided in a same space or partitioned in separate spaces.

The plurality of stacked lens groups provided in the lens module 1200 may be divided into at least three lens barrels 1210, 1220, and 1230, respectively. Even when the plurality of stacked lens groups is divided and provided in at least three lens barrels 1210, 1220, and 1230, the optical axis may be aligned in the Z-axis direction, a direction in which light may be emitted from the reflection module 1100.

The lens module 1200 may include the second driving portion 1240 to implement the AF and zoom functions.

The lens module 1220 may include at least three lens barrels, the first lens barrel 1210, the second lens barrel 1220, and the third lens barrel 1230, in the internal space of the housing 1010, and may include the second driving portion 1240 moving the three lens barrels 1210, 1220, and 1230 in the optical axis (the Z-axis) direction with respect to the housing 1010.

The first to third lens barrels 1210, 1220, and 1230 may be configured to move approximately in the optical axis (the Z-axis) direction for the AF or zoom function.

In this regard, the second driving portion 1240 generates driving force to move the first to third lens barrels 1210, 1220, and 1230 in the optical axis (the Z-axis) direction. For example, the second driving portion 1240 enables the implementation of the AF or zoom function by moving the first to third lens barrels 1210, 1220, and 1230 individually in the optical axis (the Z-axis) direction.

The first to third lens barrels 1210, 1220, and 1230 may be configured to be supported on a bottom surface of the housing 1010. For example, the first to third lens barrels 1210, 1220, and 1230 may be individually supported by ball bearings on the bottom surface of the housing 1010. Hereinafter, an example in which the first to third lens barrels 1210, 1220, and 1230 may be individually supported by ball bearings on the bottom surface of the housing 1010 will be mainly described.

As an example, the second driving portion 1240 may include a plurality of magnets 1241a, 1243a, and 1245a, and the plurality of coils 1241b, 1243b, and 1245b disposed to face the magnets 1241a, 1243a, and 1245a, respectively.

When power is applied to the coils 1241b, 1243b, and 1245b, the first to third lens barrels 1210, 1220, and 1230 on which the magnets 1241a, 1243a, and 1245a may be separately mounted may be moved in the optical axis (the Z-axis) direction by an electromagnetic effect between the magnets 1241a, 1243a, and 1245a and the coils 1241b, 1243b, and 1245b.

The plurality of magnets 1241a, 1243a, and 1245a may be separately mounted on the first to third lens barrels 1210, 1220, and 1230. As an example, the first magnet 1241a may be mounted on a side surface of the first lens barrel 1210, and the second magnet 1243a may be mounted on a side surface of the second lens barrel 1220, while the third magnet 1245a may be mounted on a side surface of the third lens barrel 1230.

The plurality of coils 1241b, 1243b, and 1245b may be mounted on the housing 1010 to face the plurality of magnets 1241a, 1243a, and 1245a, respectively. As the plurality of magnets 1241a, 1243a, and 1245a may be provided on both side surfaces of the first to third lens barrels 1210, 1220, and 1230, and the plurality of coils 1241b, 1243b, and 1245b may be provided on both side walls to face each other.

As an example, the main board 1070 may be mounted on the housing 1010, while having the plurality of coils 1241b, 1243b, and 1245b mounted thereon.

A closed loop control method involving sensing positions of the first to third lens barrels 1210, 1220, and 1230 and providing feedback may be used when moving the first to third lens barrels 1210, 1220, and 1230. Therefore, position detection sensors 1241*c*, 1243*c*, and 1245*c* may be required for the closed loop control. The position detection sensors 1241*c*, 1243*c*, and 1245*c* may be Hall sensors.

The position detection sensors 1241*c*, 1243*c*, and 1245*c* may be disposed inside or outside of the coils 1241*b*, 1243*b*, and 1245*b*, respectively, and may be mounted on the main board 1070 on which each of the coils 1241*b*, 1243*b*, and 1245*b* may be mounted.

In the drawings, the first lens barrel 1210 and the second lens barrel 1220 may be driven by a pair of coils and magnets. In this case, coils and magnets may be provided on any one side. The coils and the magnets may have somewhat increased sizes to enhance the driving force. In such case, a plurality of position detection sensors 1241*c* and 1243*c* may be provided for accurate position sensing. In the drawings, four position detection sensors 1241*c* and 1243*c* may be provided inside each of the coils 1241*b* and 1243*b* driving the first lens barrel 1210 and the second lens barrel 1220. This is because the first lens barrel 1210 and the second lens barrel 1220 may be moved a considerable distance in the optical axis direction to implement a zoom, such that a sufficient number of Hall sensors to sense the correct position should be provided.

The first lens barrel 1210 may be provided in the housing 1010 to be movable in the optical axis (the Z-axis) direction. As an example, a plurality of third ball bearings 1215 may be disposed between the first lens barrel 1210 and the bottom surface of the housing 1010.

The plurality of third ball bearings 1215 serve as bearings guiding movements of the first lens barrel 1210 in a process of implementing the AF and zoom functions.

The plurality of third ball bearings 1215 may be configured to roll in the optical axis (the Z-axis) direction when driving force moving the first lens barrel 1210 in the optical axis (the Z-axis) direction is generated. Therefore, the plurality of third ball bearings 1215 guide the movement of the first lens barrel 1210 in the optical axis (the Z-axis) direction.

A plurality of guide grooves 1214 and 1013, 1014 accommodating the third ball bearings 1215 therein may be formed on a facing bottom surface of the first lens barrel 1210 and on the bottom surface of the housing 1010 facing the first lens barrel 1210, and some of the guide grooves may be elongated in the optical axis (the Z-axis) direction.

The plurality of third ball bearings 1215 may be accommodated in the guide grooves 1214 and 1013, 1014, and may be inserted to fit between the first lens barrel 1210 and the housing 1010.

Some or all of the guide grooves 1214 and 1013, 1014 may be elongated in the optical axis (the Z-axis) direction. Further, cross sections of the guide grooves 1214 and 1013, 1014 may have various shapes, such as a rounded shape and a polygonal shape.

In this case, the first lens barrel 1210 may be pressed toward the bottom of the housing 1010 such that the plurality of third ball bearings 1215 may remain in contact with the first lens barrel 1210 and the housing 1010. To this end, a pulling yoke 1016 (for example, see FIG. 10) may be mounted on the bottom surface of the housing 1010 to face a pulling magnet 1216 (for example, see FIG. 10) mounted on the lower surface of the first lens barrel 1210. The pulling yoke 1016 may be formed of a magnetic material. A pulling magnet may be mounted on the bottom surface of the housing 1010, and a pulling yoke may be mounted on a lower surface of the first lens barrel 1210.

The coil 1241*b* driving the first lens barrel 1210 may be provided on one side surface of the housing 1010. In this case, the electromagnetic force acts on one side surface of the first lens barrel 1210, and thus the pulling magnet 1216 and the pulling yoke 1016 may be biased toward one side surface from a center of the housing 1010 in order to facilitate driving of the first lens barrel 1210. The first lens barrel 1210 may include a main body portion 1210*a* and a magnet-mounting portion 1210*b* extending to a side surface of the second lens barrel 1220 in the optical axis direction in order to increase a side of the magnet 1241*a* to enhance driving force. Further, in order to increase a side of the magnet 1243*a* for enhanced driving force, the second lens barrel 1220 may include a main body portion 1220*a* and a magnet-mounting portion 1220*b* extending to a side surface of the first lens barrel 1210 in the optical axis direction.

The coil 1243*b* driving the second lens barrel 1220 may be provided on the other side surface, which may be an opposite side surface of the one side surface of the housing 1010 on which the coil 1241*b* may be provided. In this case, as electromagnetic force may be applied to the other side surface of the second lens barrel 1220, a pulling magnet 1226 and a pulling yoke 1017 (for example, see FIG. 10) may be biased toward the other side surface from the center of the housing 1010 in order to facilitate driving of the second lens barrel 1220.

Further, the coil 1245*b* driving the third lens barrel 1230 may be provided on both side surfaces or one side surface of the housing 1010. When the coil 1245*b* is provided on only one side of the housing 1010, a pulling magnet 1236 and a pulling yoke 1018 (for example, see FIG. 10) may be biased toward one side surface from the center of the housing 1010 in order to facilitate the driving of the third lens barrel 1230, similarly to the first and second lens barrels 1210 and 1220. However, this refers to a case in which the coils driving the lens barrels 1210, 1220, and 1230 may only be provided on one side surface of the one side surface and the other side surface. When the coils are provided on both side surfaces, a pulling magnet and a pulling yoke may be provided approximately at the center of the housing 1010.

The second lens barrel 1220 may be disposed in the housing 1010 to be movable in the optical axis (the Z-axis) direction. As an example, the second lens barrel 1220 may be disposed in parallel with the first lens barrel 1210 in the optical axis direction in front of the first lens barrel 1210.

A plurality of fourth ball bearings 1225 may be disposed between the second lens barrel 1220 and the bottom surface of the housing 1010, and the second lens barrel 1220 may be slid or rolled with respect to the housing 1010 by the fourth ball bearings 1225.

The plurality of fourth ball bearings 1225 may be configured to assist in a rolling or sliding motion of the second lens barrel 1220 in the optical axis direction (the Z-axis direction) when driving force may be generated such that the second lens barrel 1220 moves in the optical axis (the Z-axis) direction.

A plurality of guide grooves 1224 and 1013, 1014 accommodating the fourth ball bearings 1225 therein may be formed on a facing bottom surface of the second lens barrel 1220 and the housing 1010, and some of the guide grooves may be elongated in the optical axis (the Z-axis) direction.

The plurality of fourth ball bearings 1225 may be accommodated in the guide grooves 1224 and 1013, 1014 and may be inserted to fit between the second lens barrel 1220 and the housing 1010.

Each of the plurality of guide grooves 1224 and 1013, 1014 may be elongated in the optical axis (the Z-axis) direction. Further, cross sections of the guide grooves 1224 and 1013, 1014 may be in various shapes such as a rounded shape, a polygonal shape, or the like.

The second lens barrel 1220 may be pressed toward the bottom surface of the housing 1010 such that the fourth ball bearings 1225 may remain in contact with the second lens barrel 1220 and the housing 1010.

To this end, the pulling yoke 1017 may be mounted on the bottom surface of the housing 1010 to face the pulling magnet 1226 mounted on the second lens barrel 1220. The pulling yoke 1017 may be a magnetic material. A pulling magnet may be mounted on a bottom surface of the housing 1010, and a pulling yoke may be mounted on a lower surface of the second lens barrel 1220.

The third lens barrel 1230 may be disposed in the housing 1010 to be movable in the optical axis (the Z-axis) direction. As an example, the third lens barrel 1230 may be disposed in parallel with the second lens barrel 1220 in the optical axis direction in front of the second lens barrel 1220.

A plurality of fifth ball bearings 1235 may be disposed between the third lens barrel 1230 and the bottom surface of the housing 1010, and the third lens barrel 1230 may be slid or rolled with respect to the housing 1010 by the fifth ball bearings 1235.

The plurality of fifth ball bearings 1235 may be configured to assist in a rolling or sliding motion of the third lens barrel 1230 in the optical axis direction (the Z-axis direction) when driving force is generated, such that the third lens barrel 1230 moves in the optical axis (the Z-axis) direction.

A plurality of guide grooves 1234 and 1015 accommodating the fifth ball bearings 1235 therein may be formed on a facing bottom surface of the third lens barrel 1230 and the housing 1010, and some of the guide grooves 1234 and 1015 may be elongated in the optical axis (the Z-axis) direction.

The plurality of fifth ball bearings 1235 may be accommodated in the guide grooves 1234 and 1015, and may be inserted to fit between the third lens barrel 1230 and the housing 1010.

Each of the plurality of guide grooves 1234 and 1015 may be elongated in the optical axis (the Z-axis) direction. Further, cross sections of the guide grooves 1234 and 1015 may have various shapes such as a rounded shape, a polygonal shape, or the like.

In this case, the third lens barrel 1230 may be pressed toward the bottom surface of the housing 1010 such that the fifth ball bearings 1235 may remain in contact with the third lens barrel 1230 and the housing 1010.

To this end, the pulling yoke 1018 may be mounted on the bottom surface of the housing 1010 to face the pulling magnet 1236 mounted on the third lens barrel 1230. The pulling yoke 1018 may be a magnetic material. A pulling magnet may be mounted on a bottom surface of the housing 1010, and a pulling yoke may be mounted on a lower surface of the third lens barrel 1230.

Guide grooves 1013, 1014, and 1015 provided in the housing 1010 to guide the movements of the third to fifth ball bearings 1215, 1225, and 1235 each may have a long groove shape extending in the optical axis direction, or be a guide groove in which at least two of the guide grooves may be mutually connected to each other. In the case of the guide groove in which at least two of the guide grooves 1013, 1014, and 1015 may be interconnected, the first to third lens barrels 1210, 1220, and 1230 may be easily aligned in the optical axis direction.

An example in which the guide groves 1013 and 1014 provided in moving paths of the first and second lens barrels 1210 and 1220 may be provided as a single guide groove in which they may be connected to each other and the third lens barrel 1230 may be separately provided, may be illustrated. Although not limited thereto, the guide grooves may be provided in the form in which only the guide grooves 1014 and 1015 used for the movements of the second and third lens barrels 1220 and 1230 may be connected to each other or in which all the guide grooves 1013, 1014, and 1015 may be connected.

At least some of the guide grooves 1214, 1224, and 1234 of the first to third lens barrels 1210, 1220, and 1230 may protrude toward the bottom of the housing 1010 on both sides of the optical axis, and thus, may be provided with anti-separation protrusions 1213, 1223, and 1233 to prevent separation of the ball bearings 1215, 1225, and 1235. The anti-separation protrusions 1213, 1223, and 1233 may be provided corresponding to the shape of the guide grooves 1013, 1014, and 1015 provided in the housing 1010. When the first to third lens barrels 1210, 1220, and 1230 move in the optical axis direction, the anti-separation protrusions 1213, 1223, and 1233 may be provided to have a space not to contact the bottom of the guide grooves 1013, 1014, and 1015.

The anti-separation protrusions are not limited to those provided in the first to third lens barrels 1210, 1220, and 1230, and may be provided in the housing 1010 on the same principle.

Figure 13A:
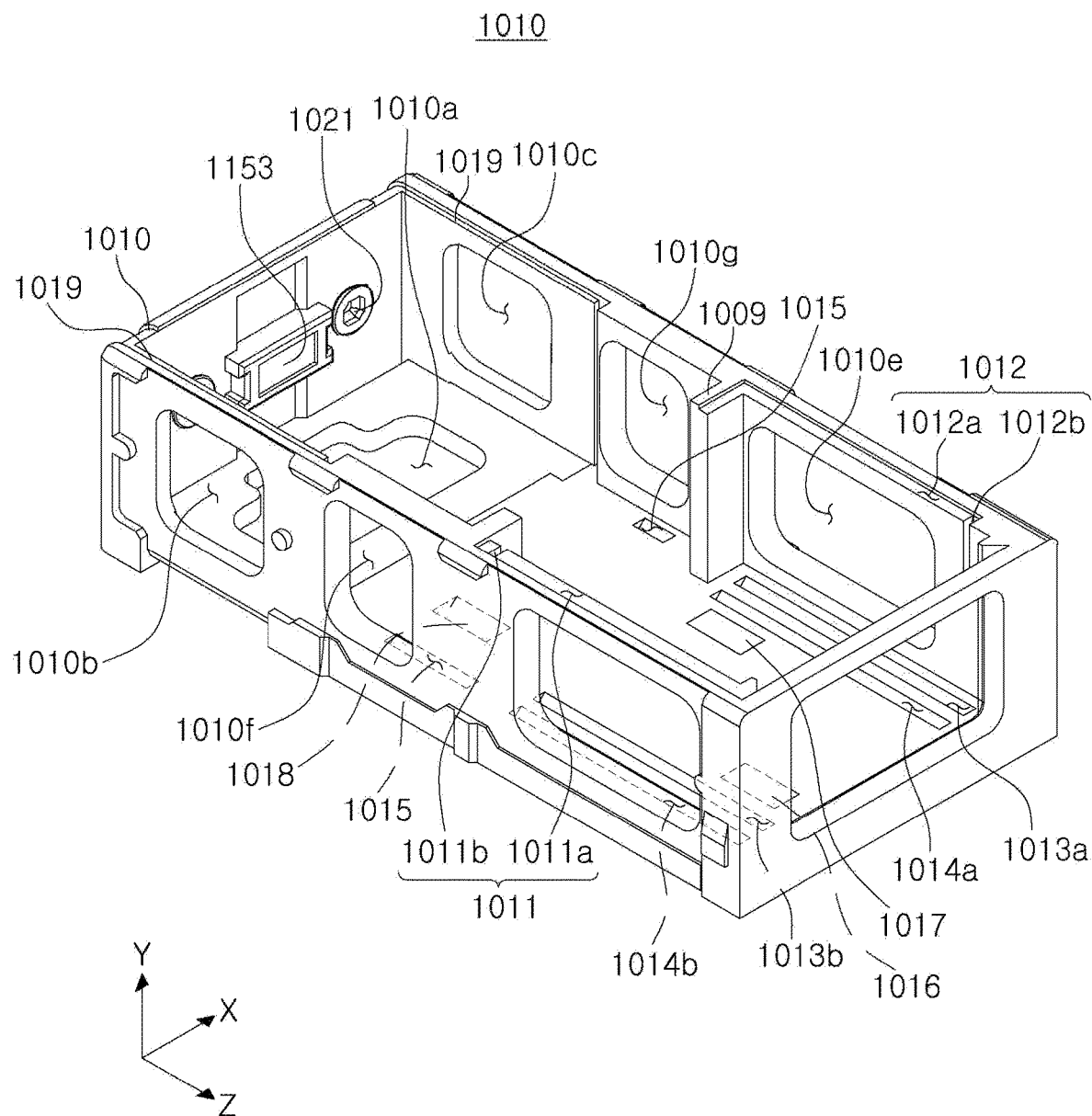
FIG. 13A is a perspective view illustrating another example of a zoom lens moving guide groove, provided in a housing according to an example.
Figure 13B:
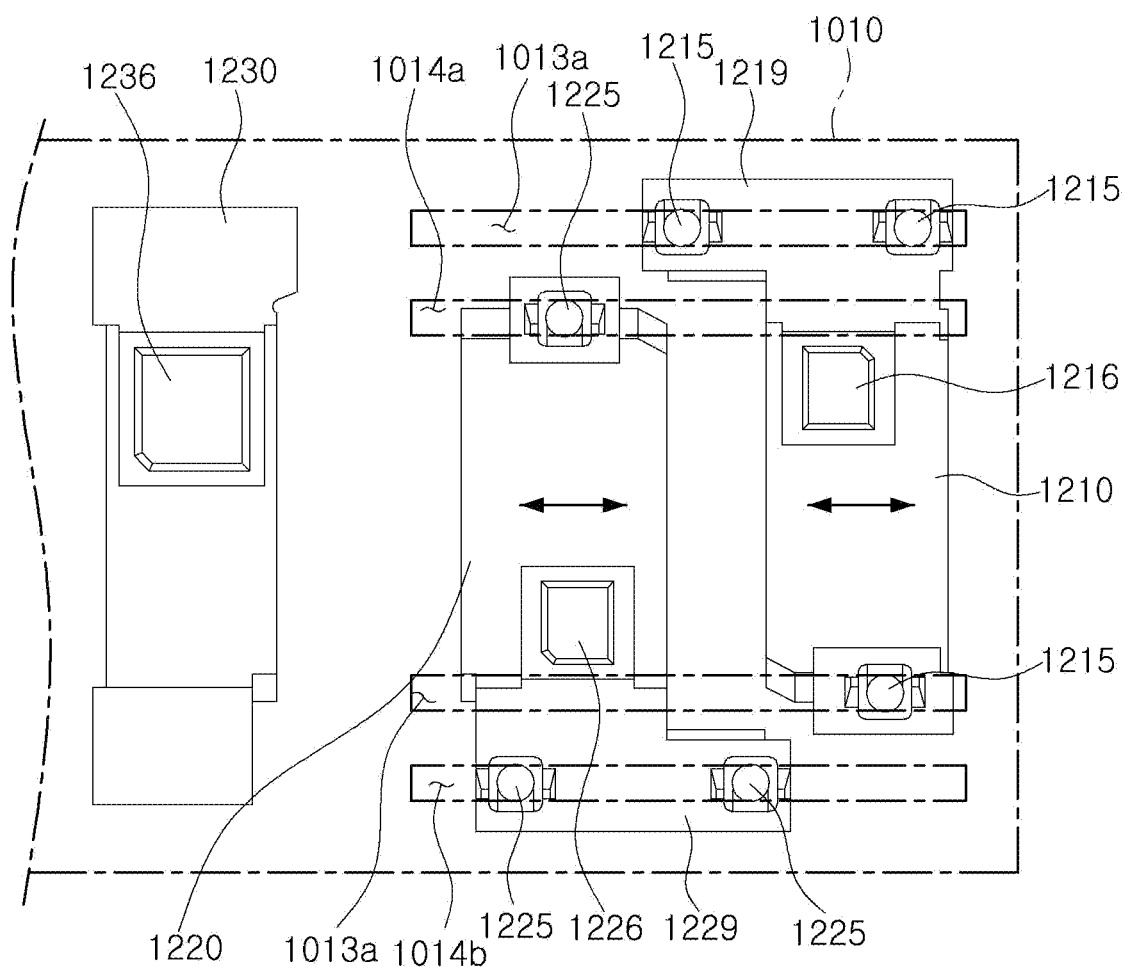
FIG. 13B is a reference view illustrating a shape in which the zoom lens of FIG. 13A is installed.

Further, referring to FIG. 13A, the housing 1010 according to another example of the present disclosure may be moved by guide grooves 1013a, 1013b, 1014a, and 1014b in which the first and second lens barrels 1210 and 1220 are respectively different. For example, the housing 1010 may include a total of four first guide grooves 1013a and 1013b and second guide grooves 1014a and 1014b respectively provided separately, and the first lens barrel 1210 may be supported by the third ball bearing 1215 fitted to the first guide grooves 1013a and 1013b, and the second lens barrel 1220 may be supported by the fourth ball bearing 1225 fitted to the second guide grooves 1014a and 1014b.

In this case, since the first lens barrel 1210 and the second lens barrel 1220 may be somewhat staggered in a direction perpendicular to the optical axis direction, each of extension portions 1219 and 1229 may sufficiently move in the optical axis direction without interference. Therefore, the zoom performance may be further improved.

The first to third lens barrels 1210, 1220, and 1230 according to this example may be sequentially provided in the optical axis direction, and the first and second lens barrels 1210 and 1220 may be respectively provided with coils 1241b and 1243b and magnets 1241a and 1243a. In addition, as illustrated, the third lens barrel 1230 may be provided with a coil 1245b and a magnet 1245a on one side thereof. The magnets 1241a, 1243a, and 1245a provided in the first to third lens barrels 1210, 1220, and 1230 may be alternately arranged in one side and the other side in a zigzag manner, to minimize the mutual electromagnetic effects.

Since the first and second lens barrels 1210 and 1220 according to this example may be moved in the optical axis direction for realizing zoom or auto focus in one space partitioned by the protruding wall(s) 1009, they may be in contact with each other. In this case, it is not possible to accurately control the optical axis direction position due to a broken or excessive stroke.

Therefore, in this example, the stopper 1060 may be provided to control the movement of the first and second lens barrels 1210 and 1220, respectively. The stopper 1060 may include a first stopper 1061 limiting a moving distance of the first lens barrel 1210, and a second stopper 1062 limiting a moving distance of the second lens barrel 1220.

The first stopper 1061 and the second stopper 1062 may be provided separately, or may be interconnected structures.

The stopper 1060 may include the first stopper 1061 and the second stopper 1062. A first frame 1061a and a second frame 1062a to be described below may be integrally connected, or may be separately provided. The first frame 1061a and the second frame 1062a may have damping materials 1061d and 1062d in portions facing the first and second lens barrels 1210 and 1220, to absorb impact of the first and second lens barrels 1210 and 1220 moving upwardly.

The first stopper 1061 may include the first frame 1061a, a first extension portion 1061b extending from the first frame 1061a in a direction perpendicular to the optical axis direction, and a first damping material 1061c provided in first extension portion 1061b. The first damping material 1061c may be fitted to a hole, provided in the first extension portion 1061b, to protrude from both sides of the first extension portion 1061b, or may be fixed on both sides of the first extension portion 1061b by bonding using an adhesive. The first frame 1061a may be mounted on the side wall and the wall on the other end of the housing 1010 to cover the upper portion of the first lens barrel 1210 in which the extension portion 1219 is provided. The first extension portion 1061b and the first damping material 1061c may be fitted between one side of the second lens barrel 1220 and the protruding wall 1009. For example, the housing may be provided with an insertion groove 1011 into which the first frame 1061a and the first extension portion 1061b are fitted. The insertion groove 1011 may include a first insertion groove 1011a provided along the internal side of the upper edge of the housing 1010, and a second insertion groove 1011b extending downwardly perpendicular to the optical axis direction from one end of the first insertion groove 1011a. The first frame 1061a may be mounted on the first insertion groove 1011a, and the first extension portion 1061b may be fitted to the second insertion groove 1011b. Of course, the first frame 1061a may be further fixed to the housing 1010 by bonding with an adhesive.

Since the first extension portion 1061b and the first damping material 1061c extend from an upper portion of the extension portion 1229 of the second lens barrel 1220 to the lower portion, a second space portion 1221, which may be a space secured to allow the first extension portion 1061b and the first damping material 1061c to extend, may be provided in the upper portion of the extension portion 1229 of the second lens barrel 1220 for securing space.

Therefore, the first lens barrel 1210 may be controlled to only move between the other end of the housing 1010 and the first damping material 1061c fitted to a front portion of the protruding wall 1009.

The second stopper 1062 may include a second frame 1062a, a second extension portion 1062b extending from the second frame 1062a in a direction perpendicular to the optical axis direction, and a second damping material 1062c provided in the second extension portion 1062b. The second damping material 1062c may be fitted into a hole provided in the second extension portion 1062b to protrude from both sides of the second extension portion 1062b, or may be fixed on both sides of the second extension portion 1062b by bonding using an adhesive. The second frame 1062a may be mounted on the upper portion of the housing 1010 and the protruding wall 1009 to cover an upper portion of one side in which the extension portion 1229 is provided in the second lens barrel 1220. The second extension portion 1062b and the second damping material 1062c may be fitted between the other side of the first lens barrel 1210 and the other internal wall of the housing 1010. For example, the housing may be provided with an insertion groove 1012 into which the second frame 1062a and the second extension portion 1062b are fitted. The insertion groove 1012 may include a first insertion groove 1012a provided along the internal side of the upper edge of the housing 1010, and a second insertion groove 1012b extending downwardly from one end of the first insertion groove 1012a in a direction perpendicular to the optical axis direction. The second frame 1062a may be mounted on the first insertion groove 1012a, and the second extension portion 1062b may be fitted to the second insertion groove 1012b. Of course, the second frame 1062a may be further fixed to the housing 1010 by bonding with an adhesive.

Since the second extension portion 1062b and the second damping material 1062c extend downwardly from the upper portion of the extension portion 1219 of the first lens barrel 1210, a first space portion 1211, which may be a space secured to allow the second extension portion 1062b and the second damping material 1062c to extend, may be provided in the upper portion of the extension portion 1219 of the first lens barrel 1210 for securing space.

Therefore, the second lens barrel 1220 may be controlled to only move between the protruding wall 1009 and the second damping material 1062c fitted to the front of the other end of the housing 1010.

Figure 14:
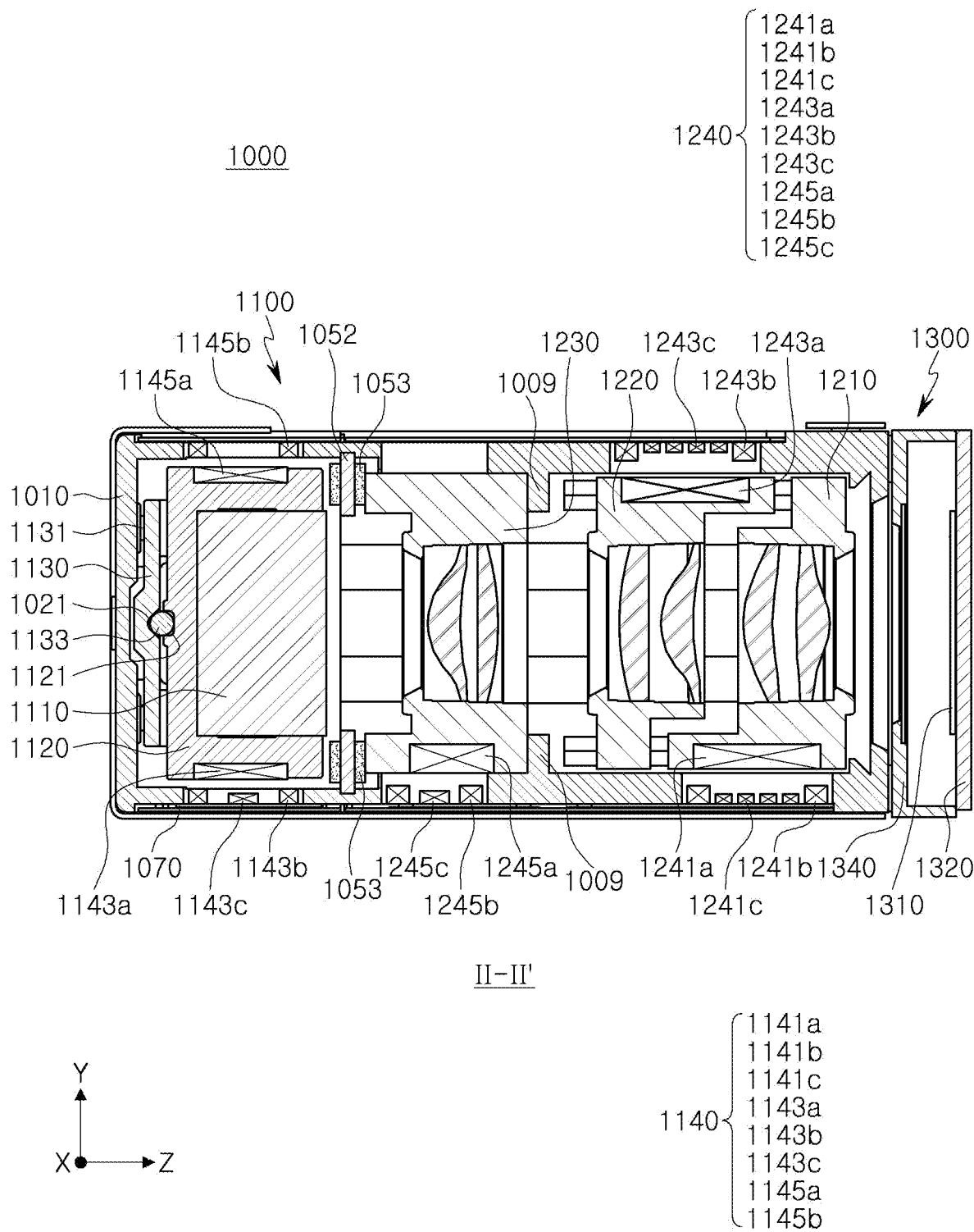
FIG. 14 is a reference view illustrating an example of a structure in which a zoom lens according to an example is fixed in a predetermined position.

Referring to FIG. 14, a mechanism for guiding a position in which a third lens barrel 1230 is fixed to a housing 1010 is illustrated.

For example, the housing 1010 of the camera module 1000 may be provided with the damper 1050 for damping the rotation holder 1100, and the damping material 1053 may be provided in the extension portion 1052 of the damper 1050 to protrude in both directions of the optical axis. The protruding wall 1009 that protrudes into an internal space and partitions a space in which the first and second lens barrels 1210 and 1220 are provided and a space in which the third lens barrel 1230 is provided may be included.

Thus, the third lens barrel 1230 may be fitted to the housing 1010 such that the protrusion wall 1009 is used as an assembly reference surface and one side is supported by the damping material 1053. Since the damping material 1053 has elastic force, the third lens barrel 1230 may be fitted between the damping material 1053 and the protruding wall 1009 in a somewhat indented manner. Alternatively, the third lens barrel 1230 may be fitted to the housing 1010 first, and then the damping material 1053 of the damper 1050 may be inserted to press the third lens barrel 1230. An adhesive may be injected between the third lens barrel 1230 and side wall or bottom of the housing 1010 such that they are bonded to each other.

Figure 15:
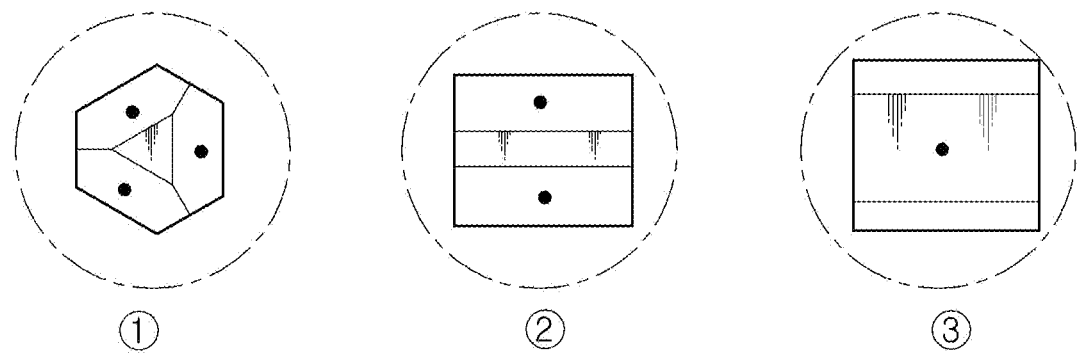
FIGS. 15 and 16 are reference views illustrating another example of a structure in which a zoom lens according to an example is accurately fixed in a predetermined position.
Figure 15:
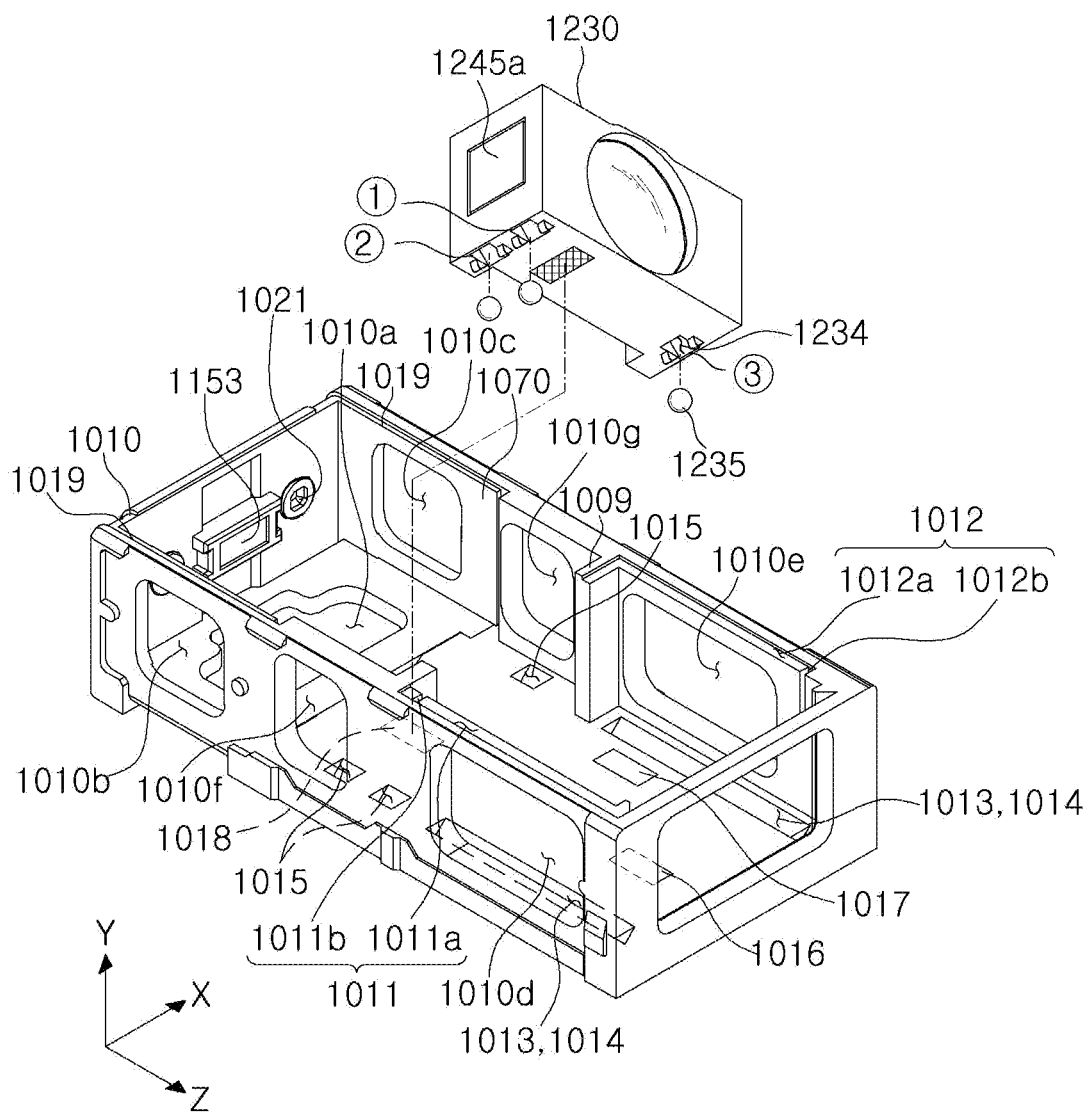
Figure 16:
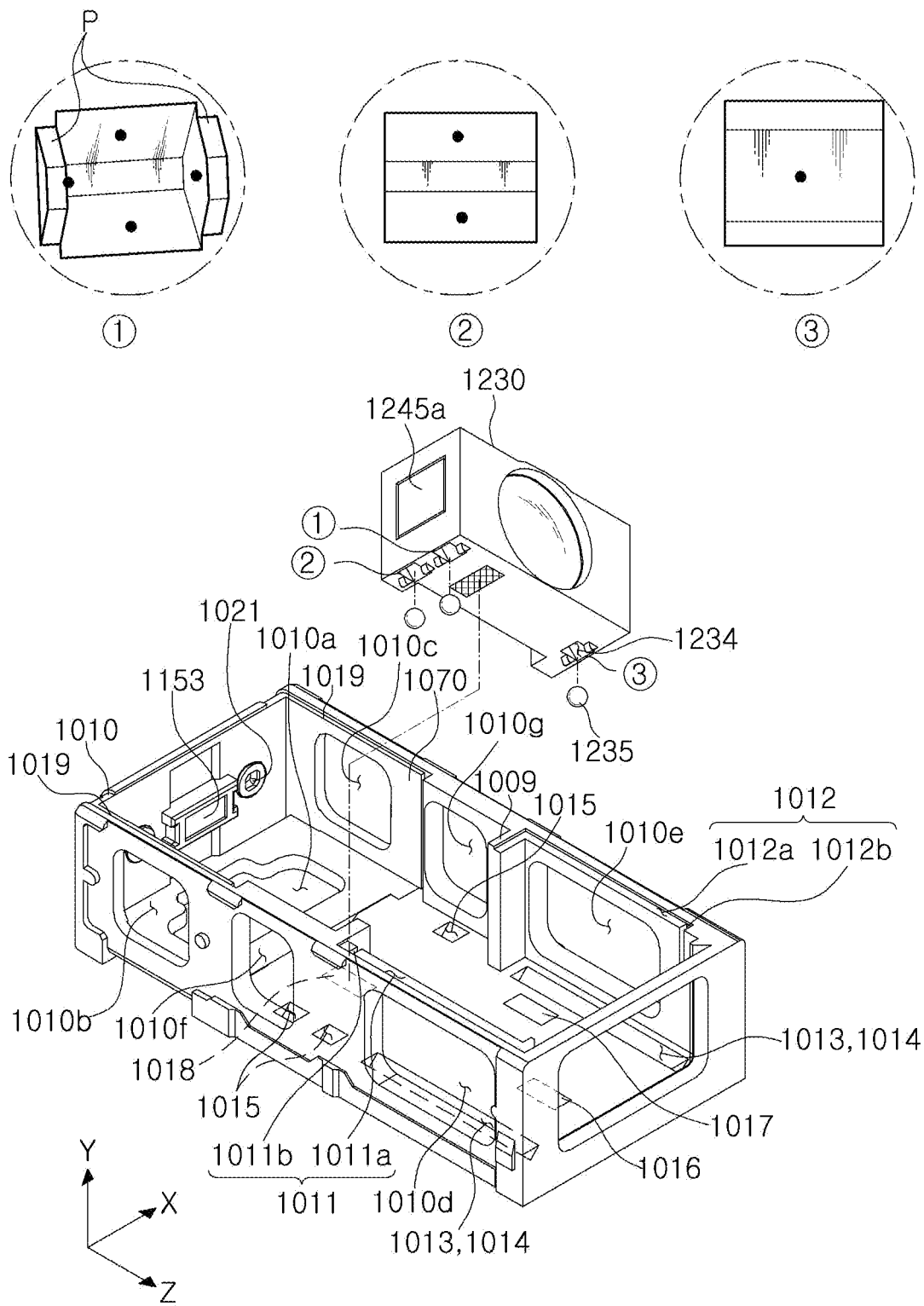

Referring to FIGS. 15 and 16, another example of a mechanism in which one of zoom lenses according to an example is accurately fixed in a predetermined position is illustrated.

In this example, since the third lens barrel 1230 is fixed to the housing 1010, a bearing required to move the third lens barrel 1230 may be unnecessary in principle. This example discloses a mechanism in which the third lens barrel 1230 is accurately disposed in a predetermined position in the housing 1010 using a ball member. After the third lens barrel 1230 is disposed in the housing 1010, an adhesive may be injected between the third lens barrel 1230 and side wall or bottom of the housing 1010 such that they may be bonded to each other.

First, referring to FIG. 15, the third lens barrel 1230 may be mounted with at least three ball members 1235 between a bottom of the housing 1010. Guide grooves 1234 and 1015 into which the ball members are inserted may be provided in portions in which the third lens barrel 1230 and the housing 1010 face each other, and these guide grooves may be provided individually for each ball member.

A pair of guide grooves 1234 and 1015 provided in the third lens barrel 1230 and the housing 1010 into which the ball members 1235 are respectively inserted may be provided with the same shape as each other (the ball member may be in contact with the third lens barrel 1230 and the guide grooves of the housing 1010 at a point), the three guide grooves provided in the third lens barrel 1230 or the housing 1010, respectively, may be provided as the shape illustrated in the enlarged view of FIG. 15 (①, ②, and ③). First, ① may be a guide groove formed by cutting all corners in the shape of a triangular pyramid, may allow the ball members 1235 to only contact three surfaces of which a dot is drawn, and may constrain the third lens barrel 1230 in the optical axis (the Z-axis) direction, the X-axis direction perpendicular to the optical axis direction, and the Y-axis direction perpendicular to the optical axis and the X axis directions, ② may be a guide groove viewed as having a 'V' shaped groove (in this case, a bottom thereof may be cut), elongated in the optical axis direction, may allow the ball members 1235 to only contact two surfaces of which a dot is drawn, and may constrain the third lens barrel 1230 in the X-axis and Y-axis directions, and ③ may be a guide groove having a long and flat bottom in the optical axis direction, may allow the ball members 1235 to only contact one surface of which a dot is drawn, and may constrain the third lens barrel 1230 in the Y-axis direction. As a result, since the X, Y, and Z axis directions of the third lens barrel 1230 may be constrained by the conditions of ①, ②, and ③, the third lens barrel 1230 may be accurately positioned by simply placing the ball members 1235 for inserting the third lens barrel 1230 into the guide grooves 1234 and 1015 into the housing 1010.

Next, referring to FIG. 16, the third lens barrel 1230 may be mounted with at least three ball members 1235 between a bottom of the housing 1010. Guide grooves 1234 and 1015 into which the ball members are inserted may be provided at portions in which the third lens barrel 1230 and the housing 1010 face each other, and these guide grooves 1234 and 1015 may be provided individually for each ball member.

A pair of guide grooves 1234 and 1015 provided in the third lens barrel 1230 and the housing 1010 into which the ball members 1235 are respectively inserted may be provided differently from each other, and the other two may be provided in the same shape with each other. For example, in the following three, ① may be a guide groove having a pair of side wall projections P in which one side should protrude and the other side should be inserted such that the guide grooves have different shapes.

The three guide grooves provided in the third lens barrel 1230 or the housing 1010, respectively, may be provided as the shape illustrated in the enlarged view of FIG. 16 (①, ②, and ③). First, ① may have a shape in which one of the third lens barrel 1230 or the housing 1010 includes a 'V' groove (in this case, a bottom thereof may be cut) and side wall protrusions P protruding from both sides, may allow the ball members 1235 to contact four surfaces dotted on one of the guide grooves and only contact two side walls of the 'V' grooves on the other guide groove, and thereby restraining in the optical axis (the Z-axis) direction, the X-axis direction perpendicular to the optical axis direction, and the Y-axis direction perpendicular to the optical axis and the X axis directions. ② may be a guide groove viewed as having a 'V' shaped groove (in this case, a bottom thereof may be cut), long in the optical axis direction, may allow the ball members 1235 to only contact two surfaces of which a dot is drawn, and may constrain the third lens barrel 1230 in the X-axis and Y-axis directions, and ③ may be a guide groove having a long and flat bottom in the optical axis direction, may allow the ball members 1235 to only contact one surface of which a dot is drawn, and may constrain the third lens barrel 1230 in the Y-axis direction. As a result, since the X, Y, and Z axis directions of the third lens barrel 1230 may be constrained by the conditions of ①, ②, and ③, the third lens barrel 1230 may be accurately positioned by simply placing the ball members 1235 for inserting the third lens barrel 1230 into the guide grooves 1234 and 1015 into the housing 1010.

FIGS. 17A through 21B are views illustrating a positional relationship between a magnet and four Hall sensors, provided in a lens barrel according to an example, and are graphs illustrating sensing values of four Hall sensors according to movement of the lens barrel in the positional relationship. FIGS. 17A through 21B include graphs illustrating individual sensing values and the sum of all sensing values of Hall sensors according to optical axis movement of a lens barrel according to an arrangement of the Hall sensors in various examples, provided to face the lens barrel moving in the optical axis (Z-axis) direction, for example, a first or second lens barrel.

Figure 17A:
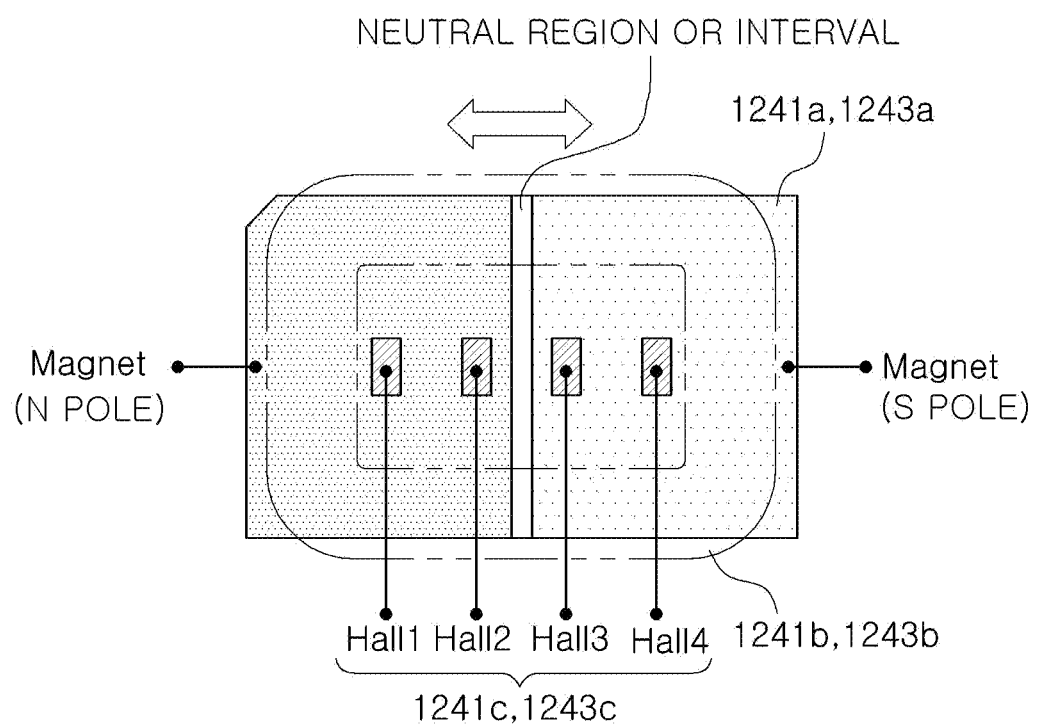
FIG. 17A is a view illustrating a positional relationship between a magnet and four Hall sensors, provided in a lens barrel according to an example.

First, referring to FIG. 17A, a lens barrel moving in the optical axis (Z-axis) direction, for example, a first or second lens barrel 1210 or 1220, may move a considerable distance in the optical axis direction to perform a zoom or auto focus function, and a position according to the distance movement may be sensed with Hall sensors 1241c or 1243c as accurately as possible.

Therefore, in this example, a plurality of position detection sensors, for example, the Hall sensors 1241c or 1243c, are provided to face the magnet 1241a or 1243a provided in the first or second lens barrel 1210 or 1220. More specifically, a set including four position detection sensors, for example, the Hall sensors 1241c or 1243c may be provided.

In this example, the magnet may be a magnet used to drive the lens barrel or may be provided separately from the lens barrel for position sensing, irrespective of the driving. Hereinafter, the magnet may be also a magnet used to drive the lens barrel or may be provided separately from the lens barrel for position sensing, irrespective of the driving, even in the position sensing structure of the lens barrel according to another example.

In this example, the magnet 1241a or 1243a may be provided to have an N pole and an S pole in a direction parallel to the optical axis, which is the moving direction of the first or second lens barrel 1210 or 1220. For example, the magnet 1241a or 1243a may be a two-pole magnet magnetized to have the N pole and the S pole in the optical axis direction (in this case, there may be a 'neutral region' between the N pole and the S pole). Alternatively, the magnet 1241a or 1243a may be respectively magnetized to have one pole, such that the two magnets having the N pole and the S pole may be sequentially arranged on a surface facing the coil 1241b or 1243b in the optical axis direction (in this case, the N pole and the S pole may be in close contact or may be spaced apart to have 'interval' between the N pole and the S pole). In all examples, the term 'interval region' may be also used as a term including the 'neutral region' and the 'interval.'

The magnet 1241a or 1243a may be provided to face the coil 1241b or 1243b.

In this case, in a non-driven state in which no power is applied to the coil 1241*b* or 1243*b*, the Hall sensors (Hall 1, Hall 2, Hall3, and Hall 4) 1241*c* or 1243*c* respectively facing the N and S poles of the magnet 1241*a* or 1243*a* may be provided, and the four Hall sensors may be arranged side by side inside a coiled portion of the coil 1241*b* or 1243*b* in the moving direction of the magnet 1241*a* or 1243*a*. The four Hall sensors may be spaced apart by the same distance, or the Hall sensors (Hall 1 to Hall 4) arranged on the N pole and the S pole about a neutral region of the magnet may be provided symmetrically.

Figure 17B:
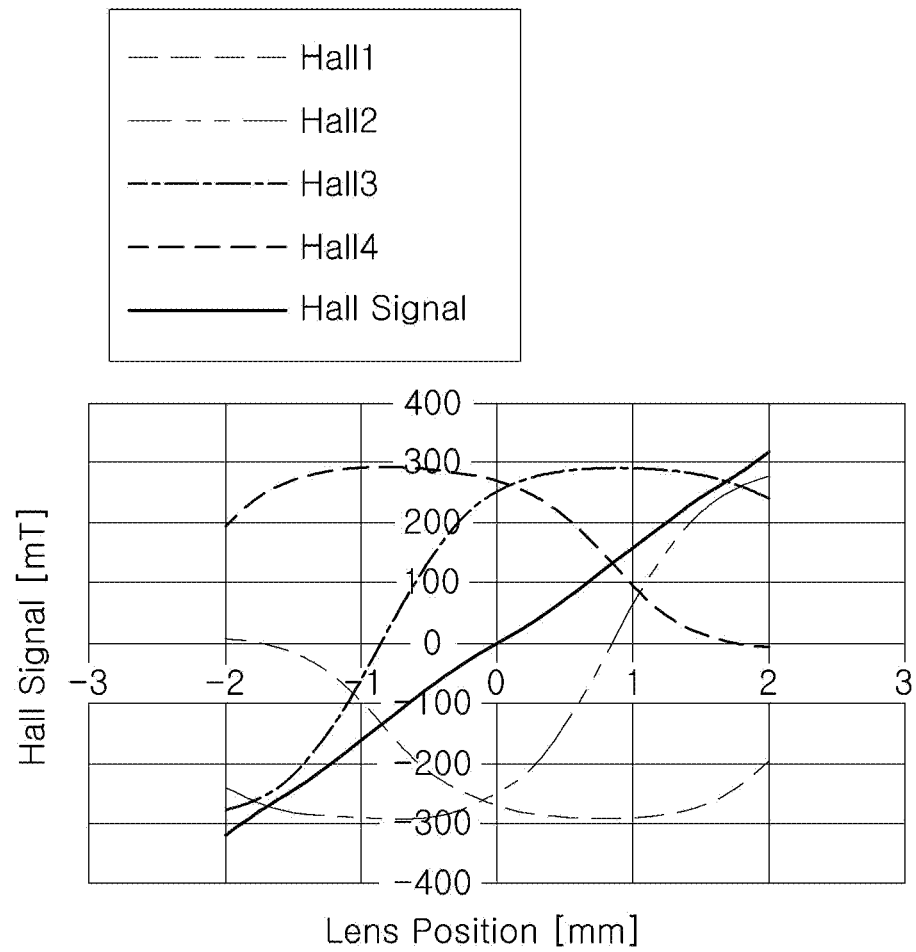
FIG. 17B is a graph illustrating sensing values of four Hall sensors according to movement of a lens barrel in the positional relationship illustrated in FIG. 17A.

In this manner, when the magnet 1241*a* or 1243*a* and the four Hall sensors 1241*c* or 1243*c* are arranged, and the magnet 1241*a* or 1243*a* moves in both directions (+ or − direction) at the corresponding positions, the four Hall sensors (Hall 1 to Hall 4) may have respective sensing values according to positions of the magnet, as illustrated in FIG. 17B. In addition, it can be seen that when these values are summed (Hall 1+Hall 2+Hall 3+Hall 4), the total hall sensing values (Hall Signal) may increase or decrease in approximate proportion to the movement of the magnet. In addition, the total hall sensing values summed within the moving range of the magnet may have different values. For example, it can be seen that the value of 'Hall Signal' in FIG. 17B has different values in the range of −2 to 2 mm.

As a result, it may be difficult to sense the position of the magnet according to a relatively long distance movement with one or a relatively small number of Hall sensors, but it can be seen that when the plurality of Hall sensors (e.g., four) are used, although the magnet may travel a relatively long distance, it is possible to more accurately sense the position.

Figure 18A:
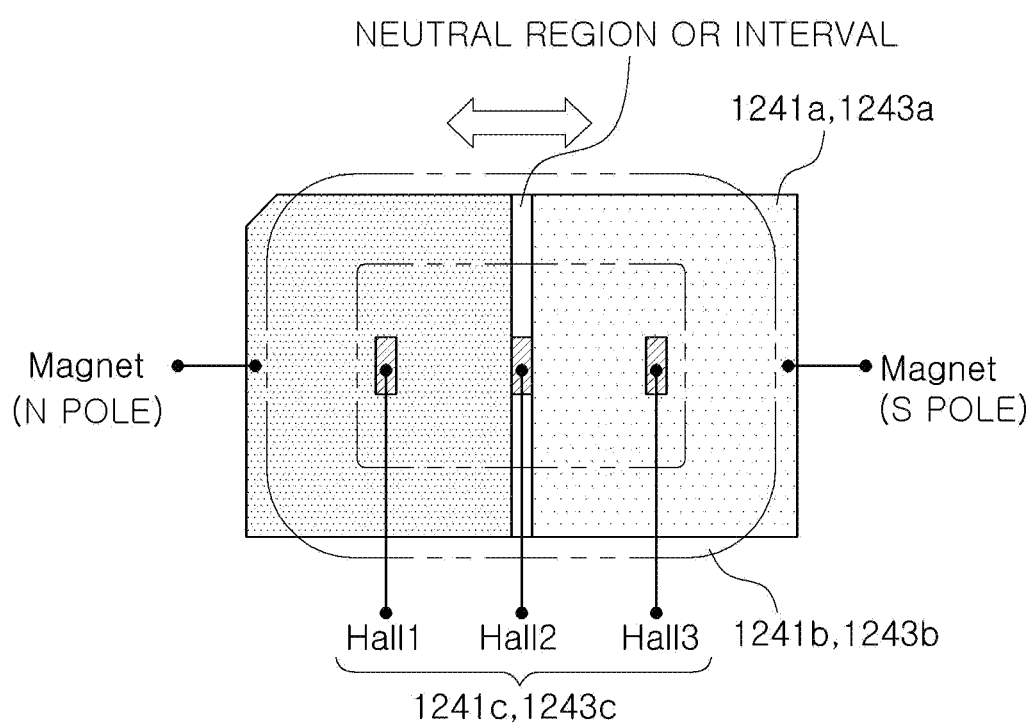
FIGS. 18A and 19A are views illustrating another example having only the modified number of Hall sensors in the positional relationship illustrated in FIG. 17A.
Figure 18B:
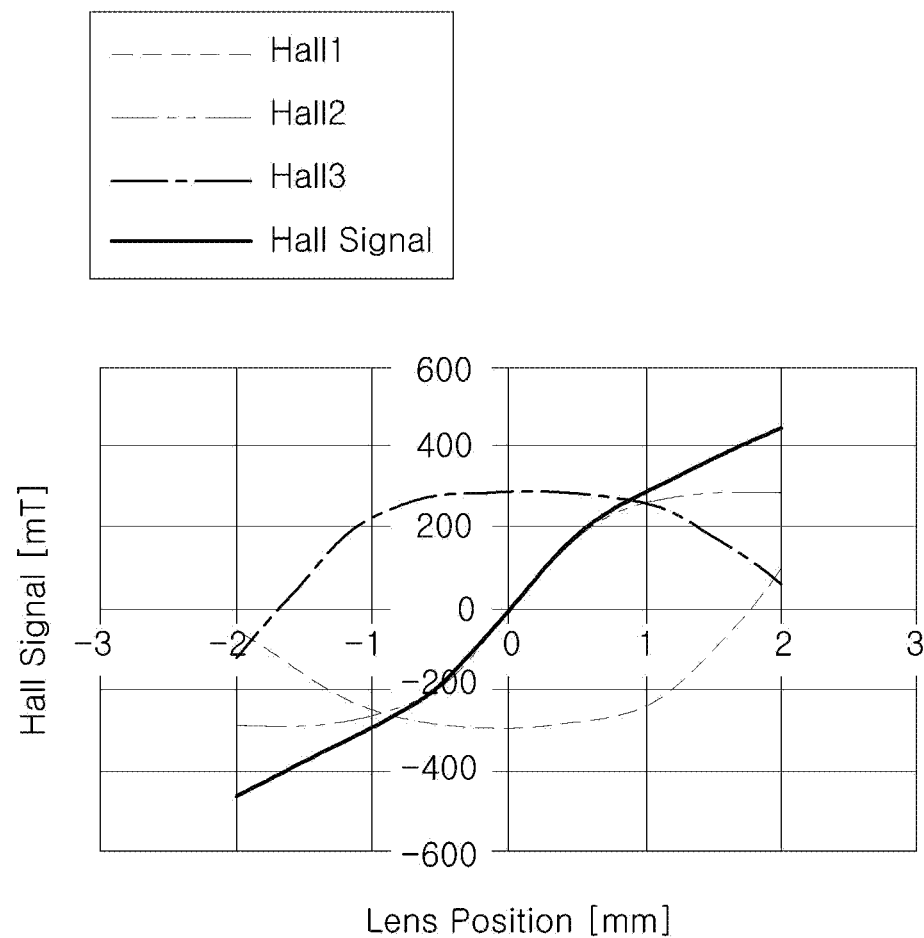
FIGS. 18B and 19B are graphs illustrating sensing values of a Hall sensor according to movement of a lens barrel in the positional relationship of another example illustrated in FIGS. 18A and 19A.
Figure 19A:
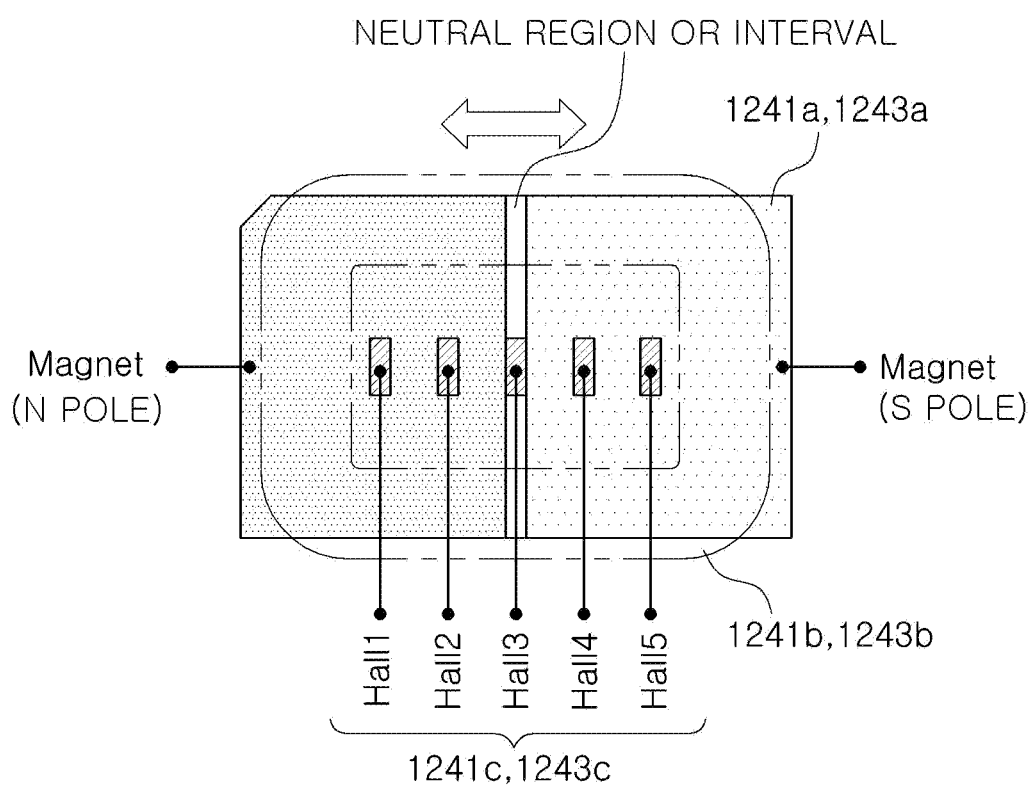
Figure 19B:
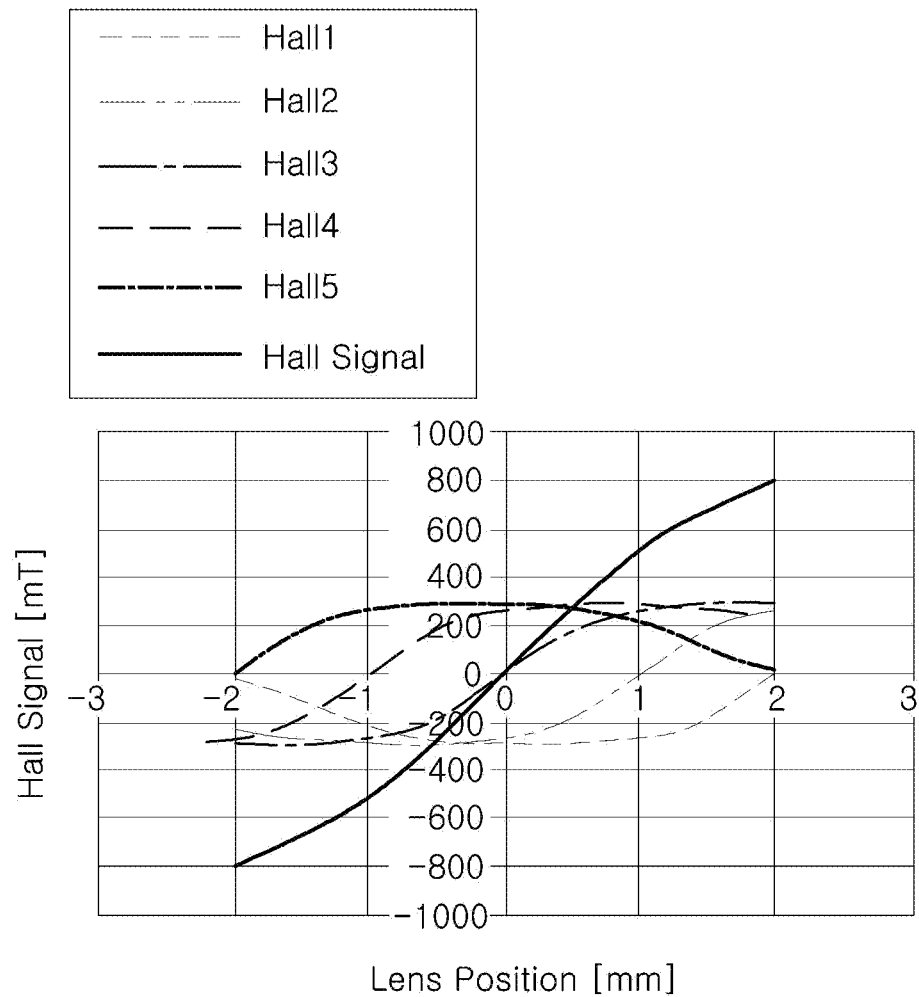

Referring to FIGS. 18A and 19A, other examples in which only the number of Hall sensors is changed in the positional relationship illustrated in FIG. 17A are illustrated. Referring to FIGS. 18B and 19B, it can be seen that the sensing signal (Hall Signal) in which these are sensed and values thereby are summed may increase or decrease in approximate proportion to the movement of the magnet.

In this case, in a non-driven state in which no power is applied to the coil 1241*b* or 1243*b*, the magnet 1241*a* or 1243*a* and the coil 1241*b* or 1243*b* may face each other in a direction facing their respective center, and the magnet 1241*a* or 1243*a* may be provided to have substantially the same distance of the N and S poles in the optical axis direction.

In other examples of FIGS. 18A and 19A, the Hall sensors 1241*c* or 1243*c* may be disposed inside the coil 1241*b* or 1243*b*, and the number of Hall sensors may be different from that illustrated in FIG. 17A.

For example, a plurality of position detection sensors (Hall sensors) 1241*c* or 1243*c* provided to face the magnet 1241*a* or 1243*a* provided in the lens barrel movable in the optical axis direction, for example, the first or second lens barrel 1210 or 1220, for example, position detection sensors 1241*c* or 1243*c* composed of a set of three position detection sensors (FIG. 18A) or five position detection sensors (FIG. 19A) may be provided. In another example, the magnet 1241*a* or 1243*a* may be provided to have the N pole and the S pole in a direction parallel to the optical axis, which is the moving direction of the first or second lens barrel 1210 or 1220. For example, the magnet 1241*a* or 1243*a* may be a two-pole magnet magnetized to have the N pole and the S pole in the optical axis direction (in this case, there may be a 'neutral region' between the N pole and the S pole). Alternatively, the magnet 1241*a* or 1243*a* may be respectively magnetized to have one pole, such that the two magnets having the N pole and the S pole may be sequentially arranged on a surface facing the coil 1241*b* or 1243*b* in the optical axis direction (in this case, the N pole and the S pole may be in close contact or may be spaced apart to have 'interval' between the N pole and the S pole).

The magnet 1241*a* or 1243*a* may face one coil 1241*b* or 1243*b*. In this case, position detecting sensors (Hall sensors) respectively facing the N pole, the S pole, and the neutral region (or the 'interval') of the magnet 1241*a* or 1243*a* may be provided.

For example, the example illustrated in FIG. 18A may include three position detecting sensors (Hall sensors, Hall 1 to Hall 3) 1241*c* or 1243*c*, and the three Hall sensors may be arranged side by side inside a coiled portion of the coil 1241*b* or 1243*b* in the moving direction of the magnet 1241*a* or 1243*a*. The three Hall sensors may be spaced apart by the same distance. Alternatively, the Hall sensors (Hall 1 to Hall 3) may be provided to respectively face the N pole, the neutral region (or the 'interval'), and the S pole of the magnet.

The example illustrated in FIG. 19A may include five position detecting sensors (Hall sensors, Hall 1 to Hall 5) 1241*c* or 1243*c*, and the five Hall sensors may be arranged side by side inside a coiled portion of the coil 1241*b* or 1243*b* in the moving direction of the magnet 1241*a* or 1243*a*. The five Hall sensors may be spaced apart by the same distance. For example, in a non-driven state in which no power is applied to the coil 1241*b* or 1243*b*, the Hall sensors (Hall 1 to Hall 5) may be provided to respectively face the N pole, the neutral region (or the 'interval'), and the S pole of the magnet. For example, two Hall sensors (Hall 1 and Hall 2) facing the N pole, one Hall sensor (Hall 3) facing the neutral region (or 'interval'), and two Hall sensors (Hall 4 and Hall 5) facing the S pole may be provided.

In this manner, when the magnet 1241*a* or 1243*a* and the three or five Hall sensors 1241*c* or 1243*c* are arranged, and the magnet 1241*a* or 1243*a* move in both directions (+ or − direction) at the corresponding positions, the three or five Hall sensors may have respective sensing values according to positions of the magnets, as illustrated in FIG. 18B (three Hall sensors) or FIG. 19B (five Hall sensors). It can be seen that when these values are summed (Hall 1+Hall 2+Hall 3, or Hall 1+Hall 2+Hall 3+Hall 4+Hall 5), the total hall sensing values (Hall Signal) may increase or decrease in approximate proportion to the movement of the magnet.

The total hall sensing values summed within the moving range of the magnet may have different values. For example, it can be seen that the values of 'Hall Signal' in FIGS. 18B and 19B have different values in the range of −2 to 2 mm.

As a result, it may be difficult to sense the position of the magnet according to a relatively long distance movement with one Hall sensor, but it can be seen that when two or more Hall sensors in an even number (e.g., FIG. 17A) or in an odd number (e.g., FIG. 18A and FIG. 19A) are used, although the magnet may travel a relatively long distance, it is possible to more accurately sense the position. In this case, in a non-driven state in which no power is applied to the coil 1241*b* or 1243*b*, the magnet 1241*a* or 1243*a* and the coil 1241*b* or 1243*b* may face each other in a direction facing their respective center, and the magnet 1241*a* or 1243*a* may be provided to have substantially the same distance of the N and S poles in the optical axis direction.

Figure 20A:
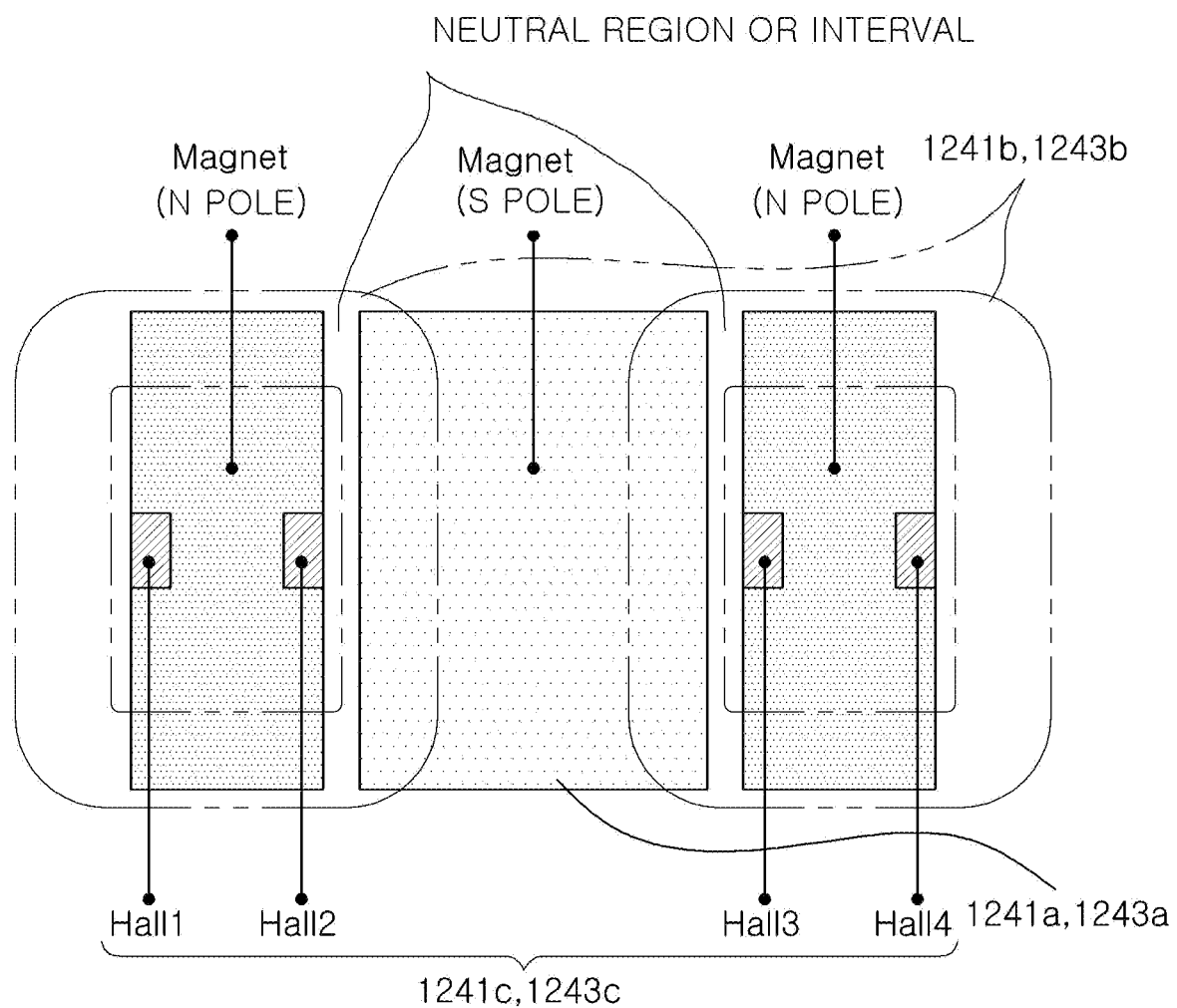
FIG. 20A is a view illustrating a positional relationship between a magnet and four Hall sensors provided in a lens barrel according to another example.
Figure 21A:
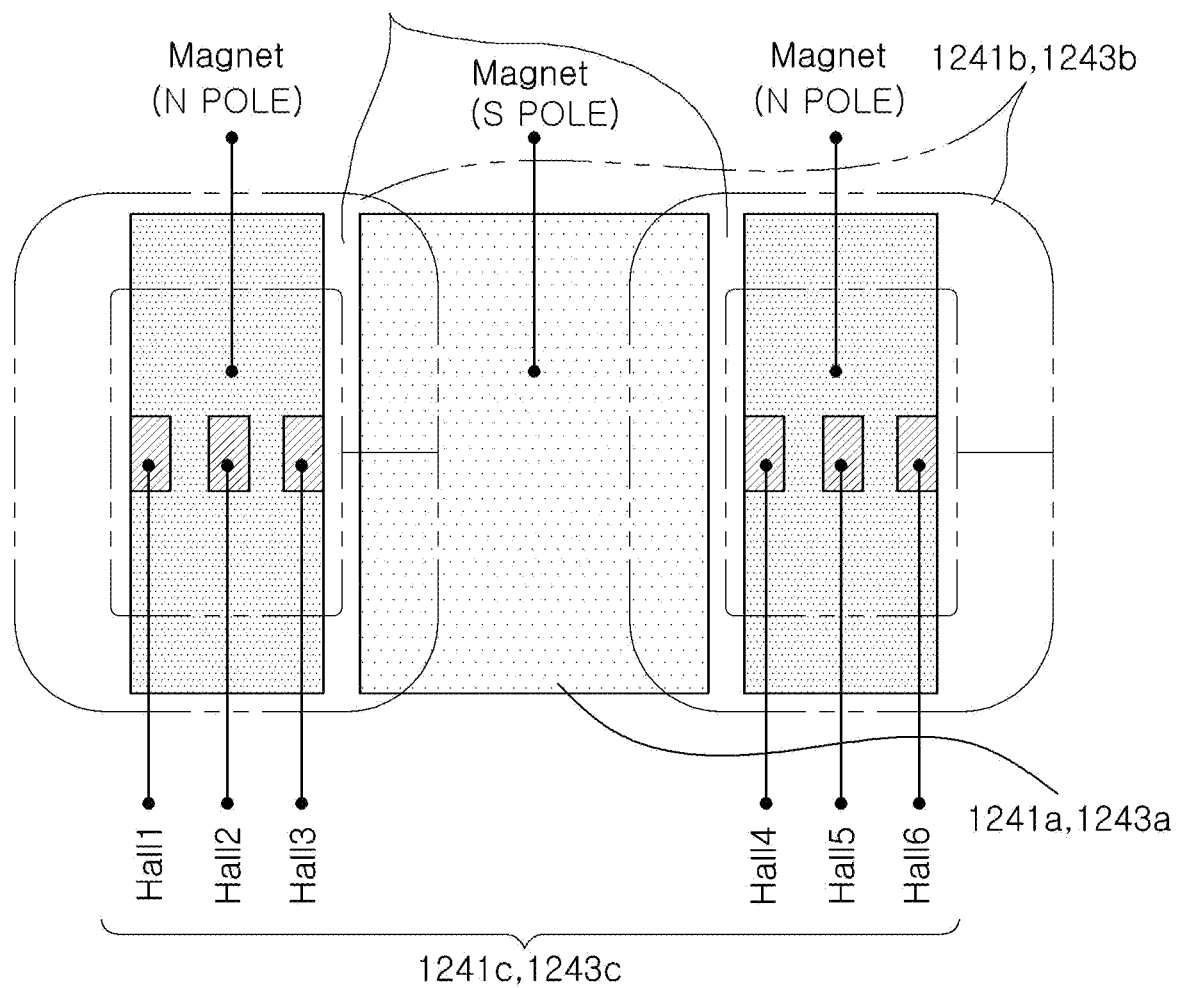
FIG. 21A is a view illustrating another example having only the modified number of Hall sensors in the positional relationship illustrated in FIG. 20A.

Next, referring to FIG. 20A or 21A, a lens barrel moving in the optical axis direction, for example, a first or second lens barrel 1210 or 1220, may move a considerable distance in the optical axis direction to perform a zoom or auto focus function, and a position according to the distance movement may be sensed with position detection sensors (Hall sensors) 1241c or 1243c as accurately as possible.

Therefore, in this example, a plurality of Hall sensors 1241c or 1243c, for example, those composed of four or six Hall sensors as a set are provided to face a magnet 1241a or 1243a provided in the first or second lens barrel 1210 or 1220.

The magnet in this example may be a magnet used to drive the lens barrel or may be provided separately from the lens barrel for position sensing.

In this example, the magnet 1241a or 1243a may be provided to have an N pole and an S pole alternately arranged in a direction parallel to the optical axis, which is the moving direction of the first or second lens barrel 1210 or 1220. For example, the magnet may be provided to have at least poles (the N pole, the S pole, and the N pole) or poles (the S pole, the N pole, and the S pole) in the optical axis direction. For example, the magnet 1241a or 1243a may be a three-pole magnet magnetized to have at least three polarities, including the N pole and the S pole, in the optical axis direction (in this case, there may be a 'neutral region' between the N pole and the S pole). Alternatively, the magnet 1241a or 1243a may be respectively magnetized to have one pole, such that the at least three magnets having the N pole and the S pole may be sequentially arranged on a surface facing the coil 1241b or 1243b in the optical axis direction (in this case, the N pole and the S pole may be in close contact or may be spaced apart to have 'interval' between the N pole and the S pole).

The magnet 1241a or 1243a may be provided to face the coil 1241b or 1243b provided as a set composed of two coils (for example, coils facing the magnet may be at least two). In this case, the two coils 1241b or 1243b may be disposed to face a center of a pole magnetized to the same polarity on both sides.

Two or three Hall sensors (Hall 1 to Hall 4 or Hall 1 to Hall 6) 1241c or 1243c respectively arranged to face two N poles or S poles on both sides of the magnet 1241a or 1243a may be provided.

For example, as illustrated in FIG. 20A, in a non-driven state in which no power is applied to the coil 1241b or 1243b, when four Hall sensors (Hall 1 to Hall 4) are provided, total of four Hall sensors may be arranged to face the magnet, two at each of two left and right ends of the two N poles provided at both sides, with the S pole interposed therebetween.

In addition, when six Hall sensors (Hall 1 to Hall 6) are provided, as illustrated in FIG. 21A, two at the left and right ends of two N poles provided at both sides with the S pole therebetween, i.e., three for each pole, six Hall sensors in total may be arranged.

The Hall sensors (Hall 1 to Hall 4 or Hall 1 to Hall 6) 1241c or 1243c may be arranged at equal intervals between sets facing the same polarity at different positions of the magnet 1241a or 1243a. For example, as illustrated in FIG. 20A or 21A, arrangements of the Hall sensors disposed inside the coil 1241b or 1243b on the left and right sides may be substantially the same.

Figure 20B:
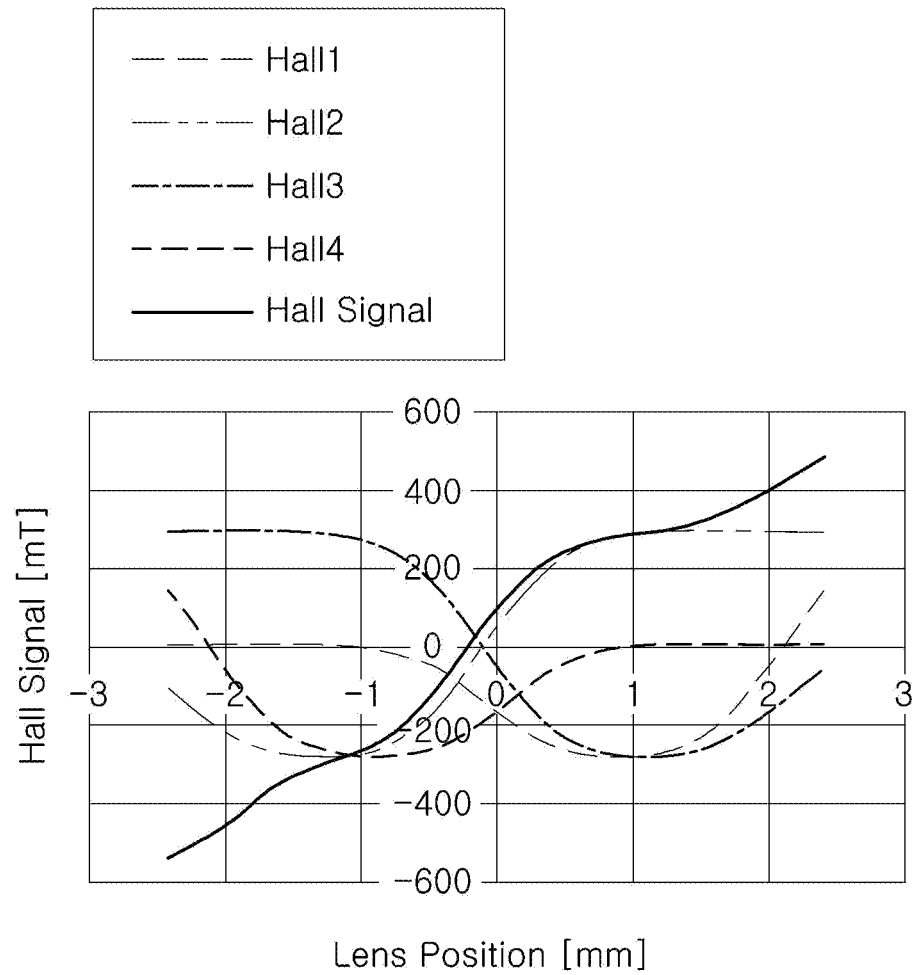
FIG. 20B is a graph illustrating sensing values of four Hall sensors according to movement of a lens barrel in the positional relationship illustrated in FIG. 20A.
Figure 21B:
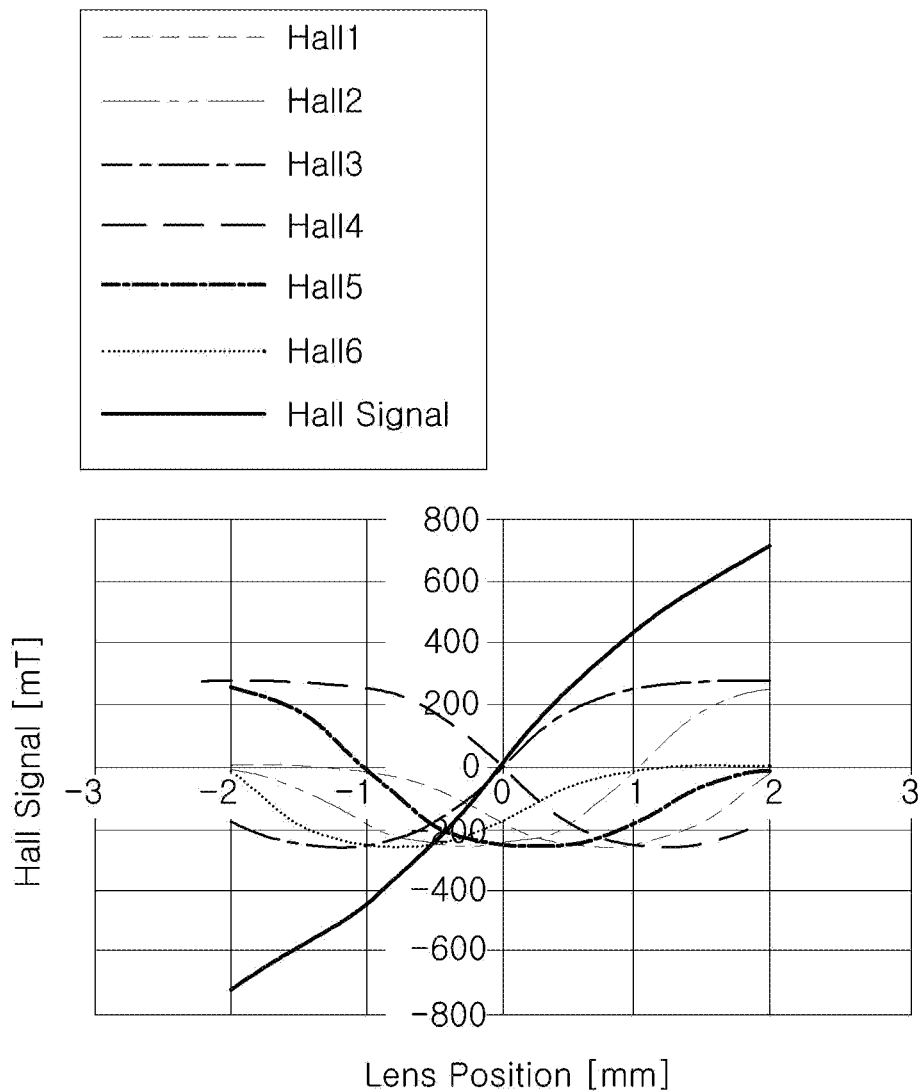
FIG. 21B is a graph illustrating sensing values of six Hall sensors according to movement of a lens barrel in the positional relationship illustrated in FIG. 21A.

In this manner, when the magnet 1241a or 1243a and the four or six Hall sensors 1241c or 1243c are arranged, and the magnet 1241a or 1243a move in both directions (+ or − direction) at the corresponding positions, the four or six Hall sensors may have respective sensing values according to positions of the magnets, as illustrated in FIG. 20B or FIG. 21B. In addition, it can be seen that when these values are partially summed and subjected to subtraction, for example, subtraction of the sum of sensing values of all Hall sensors facing the other polarity of the magnet 1241a or 1243a from the sum of sensing values of all Hall sensors facing either polarity of the magnet 1241a or 1243a, for example, {(Hall 1+Hall 2)−(Hall 3+Hall 4), or (Hall 1+Hall 2+Hall 3)−(Hall 4+Hall 5+Hall 6)}, the total hall sensing values (Hall Signal) may increase or decrease in approximate proportion to the movement of the magnet. In addition, the total hall sensing values summed within the moving range of the magnet may have different values. For example, it can be seen that the values of 'Hall Signal' in FIGS. 20B and 21B have different values in the range of −2 to 2 mm.

As a result, it may be difficult to sense the position of the magnet according to a relatively long distance movement with one Hall sensor, but it can be seen that when four or six Hall sensors are used, although the magnet may travel a relatively long distance, it is possible to more accurately sense the position. Of course, the number of Hall sensors is not limited thereto, and it is applicable when two or more Hall sensors are dividedly arranged to face the same polarity in both sides of the three-pole magnet. In this case, in a non-driven state in which no power is applied to the coil 1241b or 1243b, the magnet 1241a or 1243a and the coil 1241b or 1243b may face each other in a direction facing their respective center, and the magnet 1241a or 1243a may be provided to have substantially the same distance of at least two N poles (or S poles), facing the Hall sensors, in the optical axis direction.

Figure 22:
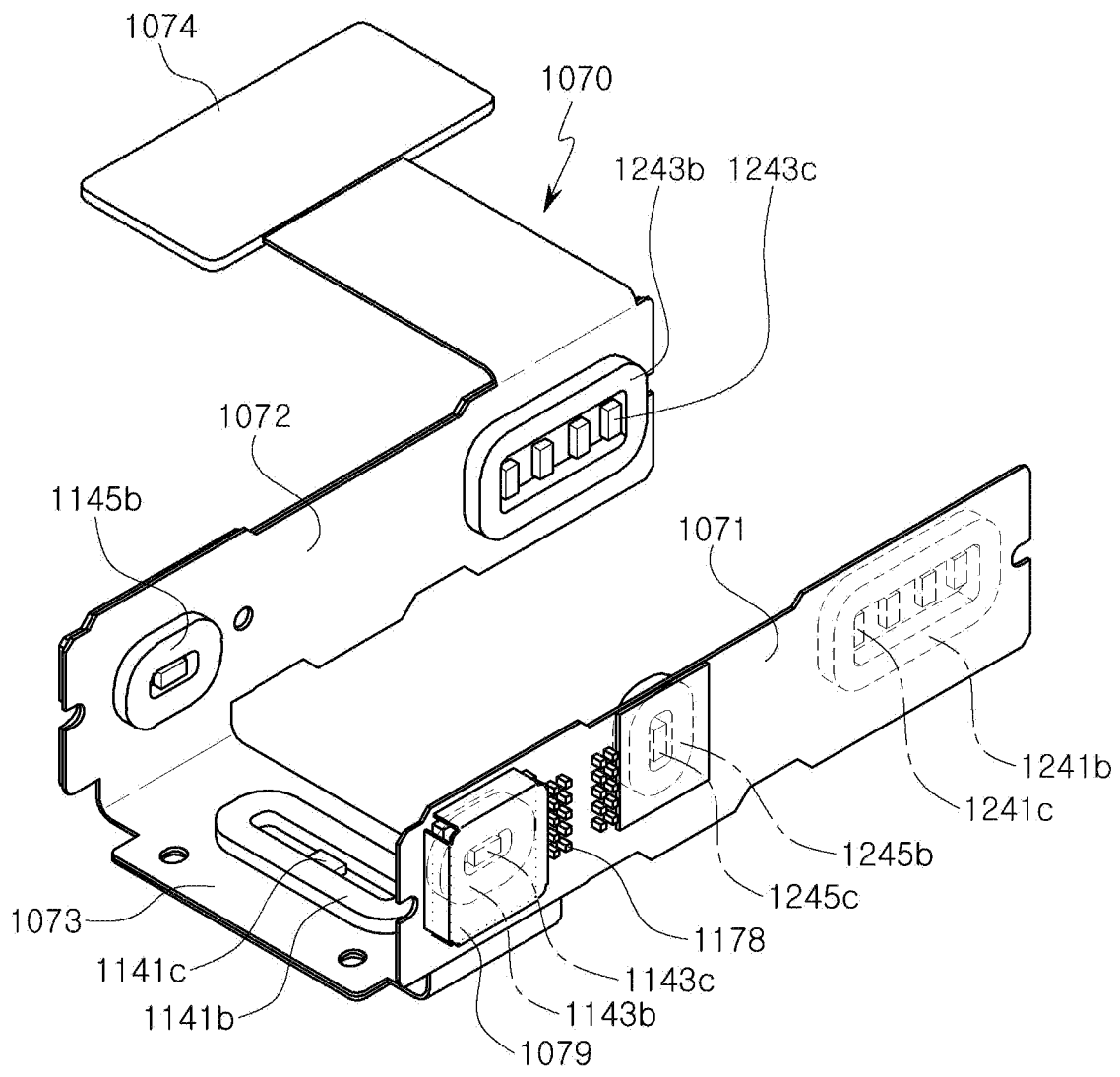
FIG. 22 is a perspective view of a main board according to an example, and coils and components mounted thereon.

FIG. 22 is a perspective view of a main board according to an example, with coils and components mounted thereon.

Referring to FIG. 22, coils 1141b, 1143b, and 1145b of the first driving portion 1140 for driving the reflection module 1100, and the plurality of coils 1241b, 1243b, and 1245b of the second driving portion 1240 for driving the lens module 1200 may be mounted on an internal surface of the main board 1070 according to an example. Further, a component 1178 such as a passive element, an active element, or the like, a gyro sensor 1079, and the like, may be mounted on an external surface of the main board 1070. Therefore, the main board 1070 may be double-sided.

Specifically, the main board 1070 may include first and second side boards 1071 and 1072 disposed approximately in parallel to each other, and a bottom board 1073 mutually connecting the first and second side boards 1071 and 1072. A terminal portion 1074 for external power and signal connection may be connected to any one of the first and second side boards 1071 and 1072 and the bottom board 1073.

Some (for example, coil 1143b, as illustrated) of the plurality of coils of the first driving portion 1140 for driving the reflection module 1100, and a sensor 1143c, and some (for example, coils 1241b and 1245b, as illustrated) of the plurality of coils of the second driving portion 1240 for driving the lens module 1200, and sensors 1241c and 1245c may be mounted on the first side board 1071.

Some (for example, coil 1145b, as illustrated) of the plurality of coils of the first driving portion 1140 for driving the reflection module 1100, and some (for example, coil 1243b, as illustrated) of the plurality of coils of the second driving portion 1240 for driving the lens module 1200, and sensor 1243c may be mounted on the second side board 1072.

The coil 1141b of the first driving portion 1140 for driving the reflection module 1100, and the sensor 1141c sensing the position of the reflection module 1100 may be mounted on the bottom board 1073.

Although the first side board 1071 is illustrated in the drawing as having components 1178 such as various passive elements and active elements, the gyro sensor 1079, and the like, mounted thereon, the components 1178, the gyro sensor 1079, and the like may be mounted on the second side board 1072, or may be suitably divided and mounted on the first and second side boards 1071 and 1072.

Further, the plurality of coils 1141*b*, 1143*b*, 1145*b*, 1241*b*, 1243*b*, and 1245*b* as well as the position detection sensors 1141*c*, 1143*c*, 1241*c*, 1243*c*, and 1245*c*, which may be mounted on the first side board 1071, the second side board 1072 and the bottom board 1073, may be variously divided and mounted on each board according to the design of a camera module.

Figure 23:
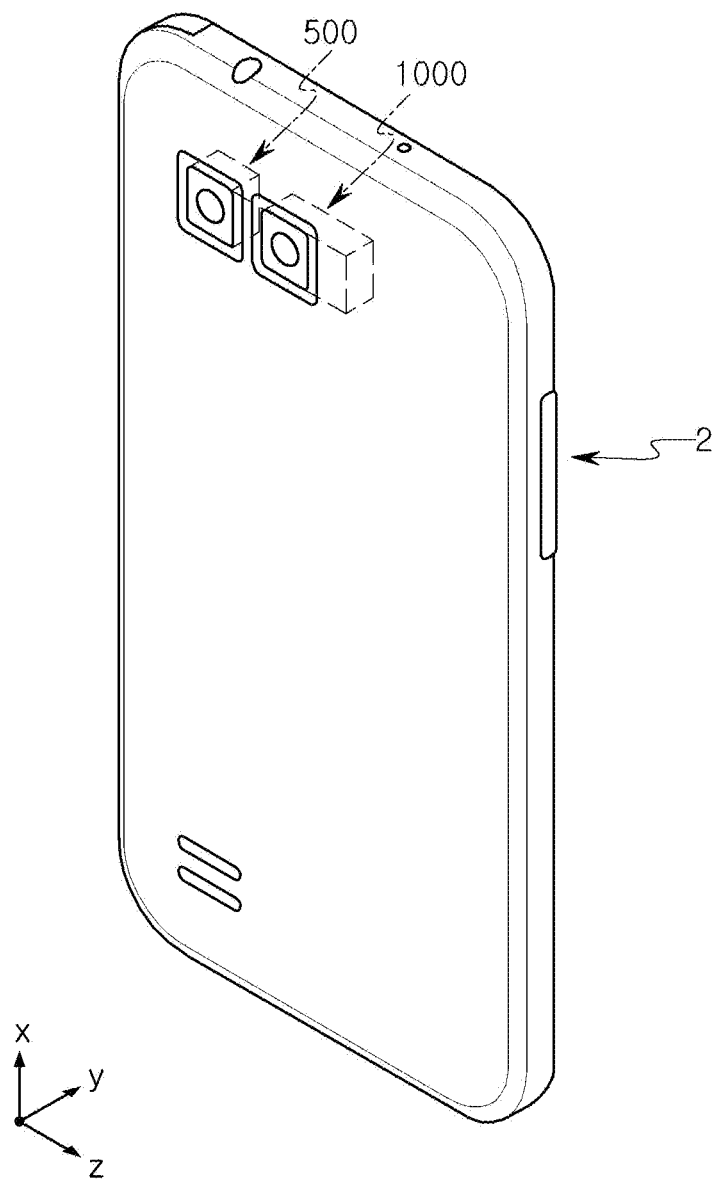
FIG. 23 is a perspective view of a portable electronic device according to another example.

FIG. 23 is a perspective view of a portable electronic device according to another example.

Referring to FIG. 23, a portable electronic device 2 may be a portable electronic device mounted with a plurality of camera modules 500 and 1000, such as a mobile communications terminal, a smartphone, a tablet PC, or the like.

The plurality of camera modules 500 and 1000 may be mounted in the portable electronic device 2.

At least one of the plurality of camera modules 500 and 1000 may be the camera module 1000 according to and the various examples described with reference to FIGS. 2 through 16.

For example, in the case of a portable electronic device including a dual camera module, at least one of two camera modules may be provided as the camera module 1000 according to the various examples.

Through this example, the camera module and the portable electronic device including the same may have a simple structure and a reduced size while implementing the functions such as the AF function, the zoom function, the OIS function, and the like. In addition, power consumption may be minimized.

The camera module may have a simple structure and a reduced size while implementing the functions such as the AF function, the zoom function, the OIS function, and the like.

Further, the various examples allow for easy alignment in an optical axis direction, even when the plurality of lens groups are provided.

In addition, a stopper or a damper may be provided such that both the zoom lens and the reflection module may be not separated from the optimal position.

In addition, in order to express performance of a zoom lens to the maximum, it is possible to accurately measure a movement position of the zoom lens by a plurality of Hall sensors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a housing;
a lens module disposed in an internal space of the housing and configured to be movable along an optical axis direction, and comprising at least one lens therein;
a magnet disposed in the lens module; and
position detection sensors configured to detect a position of the magnet, one or more of the position detection sensors being disposed to face a first polarity of the magnet and one or more of the position detection sensors being disposed to face a second polarity of the magnet different than the first polarity.

2. The camera module according to claim 1, wherein the magnet is a two-pole magnet magnetized to have an N pole, a neutral region, and an S pole, or is a magnet in which individual magnets having an N pole and an S pole are arranged adjacent to each other.

3. The camera module according to claim 2, wherein each of the position detection sensors is disposed to face only the N pole or the S pole of the magnet.

4. The camera module according to claim 2, wherein the position detection sensors comprise a first position detection sensor disposed to face the N pole, a second position detection sensor disposed to face the S pole, and a third position detection sensor disposed to face a region between the N pole and the S pole.

5. The camera module according to claim 2, wherein the position detection sensors are spaced apart from each other at equal intervals along the optical axis direction.

6. The camera module according to claim 2, further comprising a coil disposed in the housing and configured to face the magnet,
wherein the position detection sensors are disposed inside a winding of the coil.

7. The camera module according to claim 2, wherein the position of the magnet is calculated based on position values of all sensing values of the position detection sensors.

8. The camera module according to claim 7, wherein the position values are all different values within a moving range of the magnet.

9. A camera module comprising:
a housing;
a lens module disposed in an internal space of the housing and configured to be movable along an optical axis direction, and comprising at least one lens therein;
a magnet disposed in the lens module and comprising at least one N pole and at least one S pole that intersect along the optical axis direction; and
position detection sensors configured to detect a position of the magnet, one or more of the position detection sensors being disposed to face a first pole of the magnet and one or more of the position detection sensors being disposed to face a second pole of the magnet.

10. The camera module according to claim 9, wherein the magnet is a three-pole magnet magnetized to have at least three polarities, including the at least one N pole and the at least one S pole, or is a magnet in which at least three individual magnets each having an N pole and an S pole are arranged adjacent to each other.

11. The camera module according to claim 9, wherein the first pole of the magnet has a same polarity as the second pole of the magnet, and
a number of position detection sensors disposed to face the first pole of the magnet is the same as a number of position detection sensors disposed to face the second pole of the magnet.

12. The camera module according to claim 9, wherein the first pole of the magnet has a same polarity as the second pole of the magnet, the magnet comprises a third pole disposed between the first pole and the second pole along the optical axis direction, and the first pole and the second pole are spaced apart from the third pole by an equal distance along the optical axis direction.

13. The camera module according to claim 9, wherein the first pole of the magnet has a same polarity as the second pole of the magnet, and the position detection sensors comprise at least four position detection sensors including a first position detection sensor disposed to face a first end of the first pole along the optical axis direction, a second position detection sensor disposed to face a second end of the first pole along the optical axis direction, a third position detection sensor disposed to face a first end of the second pole along the optical axis direction, and a fourth position detection sensor disposed to face a second end of the second pole along the optical axis direction.

14. The camera module according to claim 13, wherein the position detection sensors comprise a fifth position detection sensor disposed between the first position detection sensor and the second position detection sensor along the optical axis direction and a sixth position detection sensor disposed between the third position detection sensor and the fourth position detection sensor along the optical axis direction.

15. The camera module according to claim 9, wherein the first pole of the magnet has a same polarity as the second pole of the magnet, and the position detection sensors comprise a first set of position detection sensors spaced apart at equal intervals and disposed to face the first pole along the optical axis direction and a second set of position detection sensors spaced apart at equal intervals and disposed to face the second pole along the optical axis direction.

16. The camera module according to claim 9, further comprising a first coil fixed to the housing and disposed in the housing to face the first pole of the magnet; and a second coil fixed to the housing and disposed in the housing to face the second pole of the magnet, wherein the first pole of the magnet has a same polarity as the second pole of the magnet.

17. A camera module comprising:

a housing;

a lens module comprising at least one lens and configured to move within the housing along an optical axis direction;

a magnet disposed in the lens module and comprising at least two poles that intersect along the optical axis direction; and position detection sensors including at least one position detection sensor disposed to face a first pole of the magnet and at least one position detection sensor disposed to face a second pole of the magnet.

18. The camera module of claim 17, wherein the first pole has a same polarity as the second pole, the magnet comprises a third pole having a different polarity than the first pole and the second pole, and the third pole is disposed between the first pole and the second pole along the optical axis direction.

19. The camera module of claim 17, wherein the first pole has a different polarity than a polarity of the second pole.

20. The camera module of claim 19, wherein the position detection sensors include at least one position detection sensor disposed in a neural region between the first pole and the second pole along the optical axis direction.

* * * * *